(12) United States Patent
Sindhu et al.

(10) Patent No.: US 11,546,189 B2
(45) Date of Patent: Jan. 3, 2023

(54) ACCESS NODE FOR DATA CENTERS

(71) Applicant: Fungible, Inc., Santa Clara, CA (US)

(72) Inventors: Pradeep Sindhu, Los Altos Hills, CA (US); Jean-Marc Frailong, Rancho Mirage, CA (US); Bertrand Serlet, Palo Alto, CA (US); Wael Noureddine, Santa Clara, CA (US); Felix A. Marti, San Francisco, CA (US); Deepak Goel, San Jose, CA (US); Paul Kim, Fremont, CA (US); Rajan Goyal, Saratoga, CA (US); Aibing Zhou, San Jose, CA (US)

(73) Assignee: Fungible, Inc., Santa Clara, CA (US)

(*) Notice: Subject to any disclaimer, the term of this patent is extended or adjusted under 35 U.S.C. 154(b) by 270 days.

(21) Appl. No.: 16/877,050

(22) Filed: May 18, 2020

(65) Prior Publication Data

US 2020/0280462 A1 Sep. 3, 2020

Related U.S. Application Data

(63) Continuation of application No. 16/031,676, filed on Jul. 10, 2018, now Pat. No. 10,659,254.
(Continued)

(51) Int. Cl.
*G06F 15/00* (2006.01)
*G06F 15/76* (2006.01)
(Continued)

(52) U.S. Cl.
CPC .......... *H04L 12/4633* (2013.01); *G06F 9/546* (2013.01); *G06F 12/0817* (2013.01);
(Continued)

(58) Field of Classification Search
CPC ............. G06F 13/1668; G06F 13/4282; G06F 12/0817; G06F 9/546; G06F 2212/1024;
(Continued)

(56) References Cited

U.S. PATENT DOCUMENTS

| 4,872,157 A | 10/1989 | Hemmady et al. |
| 4,872,159 A | 10/1989 | Hemmady et al. |

(Continued)

FOREIGN PATENT DOCUMENTS

| CN | 101447986 A | 6/2009 |
| CN | 103004158 A | 3/2013 |

(Continued)

OTHER PUBLICATIONS

"QFX10000 Switches System Architecture," White Paper, Juniper Networks, Apr. 2015, 15 pp.
(Continued)

*Primary Examiner* — Chun Kuan Lee
(74) *Attorney, Agent, or Firm* — Shumaker & Sieffert, P.A.

(57) ABSTRACT

An access node that can be configured and optimized to perform input and output (I/O) tasks, such as storage and retrieval of data to and from network devices (such as solid state drives), networking, data processing, and the like. For example, the access node may be configured to receive data to be processed, wherein the access node includes a plurality of processing cores, a data network fabric, and a control network fabric; receive, over the control network fabric, a work unit message indicating a processing task to be performed a processing core; and process the work unit message, wherein processing the work unit message includes retrieving data associated with the work unit message over the data network fabric.

18 Claims, 16 Drawing Sheets

Related U.S. Application Data

(60) Provisional application No. 62/559,021, filed on Sep. 15, 2017, provisional application No. 62/530,691, filed on Jul. 10, 2017.

(51) Int. Cl.

| | |
|---|---|
| *H04L 12/46* | (2006.01) |
| *G06F 13/16* | (2006.01) |
| *G06F 13/42* | (2006.01) |
| *G06F 12/0817* | (2016.01) |
| *H04L 49/253* | (2022.01) |
| *H04L 49/10* | (2022.01) |
| *G06F 9/54* | (2006.01) |
| *H04L 12/54* | (2022.01) |
| *H04L 45/02* | (2022.01) |
| *G06F 12/0811* | (2016.01) |
| *H04L 12/70* | (2013.01) |

(52) U.S. Cl.
CPC ...... *G06F 13/1668* (2013.01); *G06F 13/4282* (2013.01); *H04L 12/56* (2013.01); *H04L 45/02* (2013.01); *H04L 49/10* (2013.01); *H04L 49/253* (2013.01); *G06F 12/0811* (2013.01); *G06F 2212/1024* (2013.01); *G06F 2212/152* (2013.01); *G06F 2213/0026* (2013.01); *H04L 2012/5619* (2013.01); *H04L 2012/5681* (2013.01)

(58) Field of Classification Search
CPC .......... G06F 2212/152; G06F 12/0811; G06F 2213/0026; H04L 49/10; H04L 45/02; H04L 12/56; H04L 12/4633; H04L 49/253; H04L 2012/5619; H04L 2012/5681; Y02D 10/00
USPC ......................................................... 712/28
See application file for complete search history.

(56) References Cited

U.S. PATENT DOCUMENTS

| | | | |
|---|---|---|---|
| 5,301,324 A | 4/1994 | Dewey et al. | |
| 5,812,549 A | 9/1998 | Sethu | |
| 5,828,860 A | 10/1998 | Miyaoku et al. | |
| 6,021,473 A | 2/2000 | Davis et al. | |
| 6,055,579 A | 4/2000 | Goyal et al. | |
| 6,314,491 B1 | 11/2001 | Freerksen et al. | |
| 6,647,453 B1* | 11/2003 | Duncan | G06F 12/0835 |
| | | | 710/100 |
| 6,842,906 B1 | 1/2005 | Bowman-Amuah | |
| 6,901,451 B1 | 5/2005 | Miyoshi et al. | |
| 6,901,500 B1 | 5/2005 | Hussain | |
| 6,993,630 B1 | 1/2006 | Williams et al. | |
| 7,035,914 B1 | 4/2006 | Payne et al. | |
| 7,082,477 B1* | 7/2006 | Sadhasivam | H04L 63/0428 |
| | | | 370/395.6 |
| 7,275,103 B1 | 9/2007 | Thrasher et al. | |
| 7,289,964 B1 | 10/2007 | Bowman-Amuah et al. | |
| 7,342,887 B1 | 3/2008 | Sindhu | |
| 7,480,304 B2 | 1/2009 | Yeh et al. | |
| 7,486,678 B1 | 2/2009 | Devanagondi et al. | |
| 7,664,110 B1 | 2/2010 | Lovett et al. | |
| 7,733,781 B2 | 6/2010 | Petersen | |
| 7,822,731 B1 | 10/2010 | Yu et al. | |
| 7,843,907 B1 | 11/2010 | Abou-Emara et al. | |
| 7,965,624 B2 | 6/2011 | Ripa et al. | |
| 8,560,757 B2 | 10/2013 | Pangborn et al. | |
| 8,582,440 B2 | 11/2013 | Ofelt et al. | |
| 8,599,863 B2 | 12/2013 | Davis | |
| 8,625,427 B1 | 1/2014 | Terry et al. | |
| 8,737,410 B2 | 5/2014 | Davis et al. | |
| 8,798,077 B2 | 8/2014 | Mehra et al. | |
| 8,848,728 B1 | 9/2014 | Revah et al. | |
| 8,850,101 B2 | 9/2014 | Pangborn et al. | |
| 8,850,125 B2 | 9/2014 | Pangborn et al. | |
| 8,918,631 B1 | 12/2014 | Kumar et al. | |
| 8,966,152 B2 | 2/2015 | Bouchard et al. | |
| 9,065,860 B2 | 6/2015 | Pangborn et al. | |
| 9,118,984 B2 | 8/2015 | DeCusatis et al. | |
| 9,154,376 B2 | 10/2015 | Aziz | |
| 9,225,628 B2 | 12/2015 | Zahavi | |
| 9,262,225 B2 | 2/2016 | Davis et al. | |
| 9,282,384 B1 | 3/2016 | Graves | |
| 9,294,304 B2 | 3/2016 | Sindhu | |
| 9,294,398 B2 | 5/2016 | DeCusatis et al. | |
| 9,369,408 B1 | 6/2016 | Raghavan et al. | |
| 9,405,550 B2 | 8/2016 | Biran et al. | |
| 9,565,114 B1 | 2/2017 | Kabbani et al. | |
| 9,569,366 B2 | 2/2017 | Pangborn et al. | |
| 9,632,936 B1 | 4/2017 | Zuckerman et al. | |
| 9,800,495 B2 | 10/2017 | Lu | |
| 9,853,901 B2 | 12/2017 | Kampmann et al. | |
| 9,866,427 B2 | 1/2018 | Yadav et al. | |
| 9,876,735 B2 | 1/2018 | Davis et al. | |
| 9,946,671 B1 | 4/2018 | Tawri et al. | |
| 10,003,552 B2 | 6/2018 | Kumar et al. | |
| 10,104,171 B1* | 10/2018 | Savic | G06F 9/544 |
| 10,135,731 B2 | 11/2018 | Davis et al. | |
| 10,140,245 B2 | 11/2018 | Davis et al. | |
| 10,304,154 B2 | 5/2019 | Appu et al. | |
| 10,387,179 B1 | 8/2019 | Hildebrant et al. | |
| 10,425,707 B2 | 9/2019 | Sindhu et al. | |
| 10,540,288 B2 | 1/2020 | Noureddine et al. | |
| 10,565,112 B2 | 2/2020 | Noureddine et al. | |
| 10,637,685 B2 | 4/2020 | Goel et al. | |
| 10,645,187 B2 | 5/2020 | Goyal et al. | |
| 10,659,254 B2 | 5/2020 | Sindhu et al. | |
| 10,686,729 B2 | 6/2020 | Sindhu et al. | |
| 10,725,825 B2 | 7/2020 | Sindhu et al. | |
| 10,841,245 B2 | 11/2020 | Gray et al. | |
| 10,929,175 B2 | 2/2021 | Goyal et al. | |
| 11,048,634 B2 | 6/2021 | Noureddine et al. | |
| 2002/0015387 A1 | 2/2002 | Houh | |
| 2002/0049859 A1 | 4/2002 | Bruckert et al. | |
| 2002/0075862 A1 | 6/2002 | Mayes | |
| 2002/0094151 A1 | 7/2002 | Li | |
| 2002/0118415 A1 | 8/2002 | Dasylva et al. | |
| 2002/0126634 A1 | 9/2002 | Mansharamani et al. | |
| 2002/0126671 A1 | 9/2002 | Ellis et al. | |
| 2003/0043798 A1 | 3/2003 | Pugel | |
| 2003/0091271 A1 | 5/2003 | Dragone | |
| 2003/0229839 A1 | 12/2003 | Wang et al. | |
| 2004/0210320 A1 | 10/2004 | Pandya | |
| 2004/0236912 A1 | 11/2004 | Glasco | |
| 2005/0166086 A1 | 7/2005 | Watanabe | |
| 2005/0259632 A1 | 11/2005 | Malpani et al. | |
| 2006/0029323 A1 | 2/2006 | Nikonov et al. | |
| 2006/0056406 A1 | 3/2006 | Bouchard et al. | |
| 2006/0092976 A1* | 5/2006 | Lakshman | H04L 45/60 |
| | | | 370/469 |
| 2006/0112226 A1 | 5/2006 | Hady et al. | |
| 2006/0277421 A1 | 12/2006 | Balestriere | |
| 2007/0073966 A1 | 3/2007 | Corbin | |
| 2007/0172235 A1 | 7/2007 | Snider et al. | |
| 2007/0192545 A1 | 8/2007 | Gara et al. | |
| 2007/0198656 A1 | 8/2007 | Mazzaferri et al. | |
| 2007/0255906 A1 | 11/2007 | Handgen et al. | |
| 2008/0002702 A1 | 1/2008 | Bajic | |
| 2008/0138067 A1 | 6/2008 | Beshai | |
| 2008/0244231 A1 | 10/2008 | Kunze et al. | |
| 2009/0024836 A1 | 1/2009 | Shen et al. | |
| 2009/0083263 A1 | 3/2009 | Felch et al. | |
| 2009/0135739 A1 | 5/2009 | Hoover et al. | |
| 2009/0135832 A1 | 5/2009 | Fan et al. | |
| 2009/0228890 A1 | 9/2009 | Vaitovirta et al. | |
| 2009/0234987 A1 | 9/2009 | Lee et al. | |
| 2009/0285228 A1 | 11/2009 | Bagepalli et al. | |
| 2009/0303880 A1 | 12/2009 | Maltz et al. | |
| 2010/0061391 A1 | 3/2010 | Sindhu et al. | |
| 2010/0125903 A1 | 5/2010 | Devarajan et al. | |
| 2010/0318725 A1 | 12/2010 | Kwon | |
| 2011/0289179 A1 | 1/2011 | Pekcan et al. | |

(56) References Cited

U.S. PATENT DOCUMENTS

| | | |
|---|---|---|
| 2011/0055827 A1 | 3/2011 | Lin et al. |
| 2011/0113184 A1 | 3/2011 | Chu |
| 2011/0170553 A1 | 7/2011 | Beecroft et al. |
| 2011/0173392 A1 | 7/2011 | Gara et al. |
| 2011/0202658 A1 | 8/2011 | Okuno et al. |
| 2011/0225594 A1 | 9/2011 | Iyengar et al. |
| 2011/0228783 A1 | 9/2011 | Flynn et al. |
| 2011/0238923 A1 | 9/2011 | Hooker et al. |
| 2011/0289180 A1 | 11/2011 | Sonnier et al. |
| 2011/0289279 A1 | 11/2011 | Sonnier et al. |
| 2012/0030431 A1 | 2/2012 | Anderson et al. |
| 2012/0036178 A1 | 2/2012 | Gavini et al. |
| 2012/0076153 A1 | 3/2012 | Manzella et al. |
| 2012/0096211 A1 | 4/2012 | Davis et al. |
| 2012/0176890 A1 | 7/2012 | Balus et al. |
| 2012/0177047 A1 | 7/2012 | Roitshtein |
| 2012/0207165 A1 | 8/2012 | Davis |
| 2012/0254587 A1 | 10/2012 | Biran et al. |
| 2012/0314710 A1 | 12/2012 | Shikano |
| 2013/0003725 A1 | 1/2013 | Hendel et al. |
| 2013/0024875 A1 | 1/2013 | Wang et al. |
| 2013/0028083 A1 | 1/2013 | Yoshida et al. |
| 2013/0088971 A1 | 4/2013 | Anantharam et al. |
| 2013/0145375 A1 | 6/2013 | Kang |
| 2013/0191443 A1 | 7/2013 | Gan et al. |
| 2013/0258912 A1 | 10/2013 | Zimmerman et al. |
| 2013/0330076 A1 | 12/2013 | Liboiron-Ladouceur et al. |
| 2013/0346789 A1 | 12/2013 | Brunel et al. |
| 2014/0023080 A1 | 1/2014 | Zhang et al. |
| 2014/0040909 A1 | 2/2014 | Winser et al. |
| 2014/0044128 A1 | 2/2014 | Suresh et al. |
| 2014/0059537 A1 | 2/2014 | Kamble et al. |
| 2014/0075085 A1 | 3/2014 | Schroder et al. |
| 2014/0161450 A1 | 6/2014 | Graves et al. |
| 2014/0187317 A1 | 7/2014 | Kohler et al. |
| 2014/0258479 A1 | 9/2014 | Tenginakai et al. |
| 2014/0269351 A1 | 9/2014 | Graves et al. |
| 2014/0310467 A1 | 10/2014 | Shalf et al. |
| 2014/0359044 A1 | 12/2014 | Davis et al. |
| 2015/0019702 A1 | 1/2015 | Kancherla |
| 2015/0037032 A1 | 2/2015 | Xu et al. |
| 2015/0043330 A1 | 2/2015 | Hu et al. |
| 2015/0117860 A1 | 4/2015 | Braun |
| 2015/0143045 A1 | 5/2015 | Han et al. |
| 2015/0143073 A1 | 5/2015 | Winser et al. |
| 2015/0163171 A1 | 6/2015 | Sindhu et al. |
| 2015/0180603 A1 | 6/2015 | Darling et al. |
| 2015/0186313 A1 | 7/2015 | Sodhi et al. |
| 2015/0222533 A1 | 8/2015 | Birrittella et al. |
| 2015/0242324 A1* | 8/2015 | Novakovic ......... G06F 12/0813 711/121 |
| 2015/0244617 A1 | 8/2015 | Nakil et al. |
| 2015/0254182 A1 | 9/2015 | Asher et al. |
| 2015/0256405 A1 | 9/2015 | Janardhanan et al. |
| 2015/0278148 A1 | 10/2015 | Sindhu |
| 2015/0278984 A1 | 10/2015 | Koker et al. |
| 2015/0280939 A1 | 10/2015 | Sindhu |
| 2015/0281128 A1 | 10/2015 | Sindhu |
| 2015/0324205 A1 | 11/2015 | Eisen et al. |
| 2015/0325272 A1 | 11/2015 | Murphy |
| 2015/0334034 A1 | 11/2015 | Smedley et al. |
| 2015/0334202 A1 | 11/2015 | Frydman et al. |
| 2015/0355946 A1 | 12/2015 | Kang |
| 2015/0378776 A1 | 12/2015 | Lippett |
| 2015/0381528 A9 | 12/2015 | Davis et al. |
| 2016/0056911 A1 | 2/2016 | Ye et al. |
| 2016/0062800 A1 | 3/2016 | Stanfill et al. |
| 2016/0092362 A1 | 3/2016 | Barron et al. |
| 2016/0164625 A1 | 6/2016 | Gronvall et al. |
| 2016/0188344 A1 | 6/2016 | Tamir et al. |
| 2016/0210159 A1 | 7/2016 | Wilson et al. |
| 2016/0239415 A1 | 8/2016 | Davis et al. |
| 2016/0241430 A1 | 8/2016 | Yadav et al. |
| 2016/0337723 A1 | 11/2016 | Graves |
| 2016/0364333 A1 | 12/2016 | Brown et al. |
| 2016/0364334 A1 | 12/2016 | Asaro et al. |
| 2016/0380885 A1 | 12/2016 | Jani et al. |
| 2017/0005921 A1 | 1/2017 | Liu et al. |
| 2017/0031719 A1 | 2/2017 | Clark et al. |
| 2017/0032011 A1 | 2/2017 | Song et al. |
| 2017/0060615 A1 | 3/2017 | Thakkar et al. |
| 2017/0061566 A1 | 3/2017 | Min et al. |
| 2017/0068639 A1 | 3/2017 | Davis et al. |
| 2017/0083257 A1 | 3/2017 | Jain et al. |
| 2017/0235581 A1 | 8/2017 | Nickolls et al. |
| 2017/0265220 A1 | 9/2017 | Andreoli-Fang et al. |
| 2017/0286143 A1 | 10/2017 | Wagner et al. |
| 2017/0286157 A1 | 10/2017 | Hasting et al. |
| 2017/0346766 A1 | 11/2017 | Dutta |
| 2018/0011739 A1 | 1/2018 | Pothula et al. |
| 2018/0024771 A1 | 1/2018 | Miller et al. |
| 2018/0026901 A1 | 1/2018 | Sugunadass |
| 2018/0095878 A1* | 4/2018 | Katayama ............... G06F 9/52 |
| 2018/0115494 A1 | 4/2018 | Bhatia et al. |
| 2018/0152317 A1 | 5/2018 | Chang et al. |
| 2018/0234300 A1 | 8/2018 | Mayya et al. |
| 2018/0239702 A1 | 8/2018 | Farmahini Farahani et al. |
| 2018/0287818 A1 | 10/2018 | Goel et al. |
| 2018/0287965 A1 | 10/2018 | Sindhu et al. |
| 2018/0288505 A1 | 10/2018 | Sindhu et al. |
| 2018/0293168 A1 | 10/2018 | Noureddine et al. |
| 2018/0300928 A1 | 10/2018 | Koker et al. |
| 2018/0307494 A1 | 10/2018 | Ould-Ahmed-Vall et al. |
| 2018/0307535 A1 | 10/2018 | Suzuki et al. |
| 2018/0322386 A1 | 11/2018 | Sridharan et al. |
| 2018/0357169 A1 | 12/2018 | Lai |
| 2018/0357172 A1* | 12/2018 | Lai ...................... G06F 12/0833 |
| 2019/0005176 A1 | 1/2019 | Illikkal et al. |
| 2019/0012278 A1 | 1/2019 | Sindhu et al. |
| 2019/0012350 A1 | 1/2019 | Sindhu et al. |
| 2019/0013965 A1 | 1/2019 | Sindhu et al. |
| 2019/0018806 A1 | 1/2019 | Koufaty et al. |
| 2019/0042292 A1 | 2/2019 | Palermo et al. |
| 2019/0042518 A1 | 2/2019 | Marolia et al. |
| 2019/0095333 A1 | 3/2019 | Heirman et al. |
| 2019/0102311 A1 | 4/2019 | Gupta et al. |
| 2019/0104057 A1 | 4/2019 | Goel et al. |
| 2019/0104206 A1 | 4/2019 | Goel et al. |
| 2019/0104207 A1 | 4/2019 | Goel et al. |
| 2019/0158428 A1 | 5/2019 | Gray et al. |
| 2019/0188079 A1 | 6/2019 | Kohli |
| 2019/0243765 A1 | 8/2019 | Sindhu et al. |
| 2019/0363989 A1 | 11/2019 | Shalev et al. |
| 2020/0021664 A1 | 1/2020 | Goyal et al. |
| 2020/0021898 A1 | 1/2020 | Sindhu et al. |
| 2020/0119903 A1 | 4/2020 | Thomas et al. |
| 2020/0133771 A1 | 4/2020 | Goyal et al. |
| 2020/0145680 A1 | 5/2020 | Dikshit et al. |
| 2020/0151101 A1 | 5/2020 | Noureddine et al. |
| 2020/0159568 A1 | 5/2020 | Goyal et al. |
| 2020/0159859 A1 | 5/2020 | Beckman et al. |
| 2020/0169513 A1 | 5/2020 | Goel et al. |
| 2020/0183841 A1 | 6/2020 | Noureddine et al. |
| 2020/0259682 A1 | 8/2020 | Goel et al. |
| 2020/0280462 A1 | 9/2020 | Sindhu et al. |
| 2020/0314026 A1 | 10/2020 | Sindhu et al. |
| 2020/0356414 A1 | 11/2020 | Sindhu et al. |

FOREIGN PATENT DOCUMENTS

| | | |
|---|---|---|
| CN | 104052618 A | 9/2014 |
| CN | 104521196 A | 4/2015 |
| CN | 104954247 A | 9/2015 |
| CN | 104954251 A | 9/2015 |
| CN | 105024844 A | 11/2015 |
| EP | 1079571 A2 | 2/2001 |
| EP | 1489796 A2 | 12/2004 |
| EP | 1501246 A2 | 1/2005 |
| EP | 2289206 A2 | 3/2011 |
| EP | 2928134 A2 | 7/2015 |
| WO | 2009114554 A2 | 9/2009 |
| WO | 2013184846 A1 | 12/2013 |

(56) References Cited

FOREIGN PATENT DOCUMENTS

| WO | 2014178854 A1 | 11/2014 |
|---|---|---|
| WO | 2016037262 A1 | 3/2016 |
| WO | 2019014268 A1 | 1/2019 |

OTHER PUBLICATIONS

Advisory Action from U.S. Appl. No. 16/031,921, dated Jun. 12, 2020, 8 pp.

Adya et al., "Cooperative Task Management without Manual Stack Management," Proceedings of the 2002 Usenix Annual Technical Conference, Jun. 2002, 14 pp.

Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.

Alizadeh et al., "CONGA: Distributed Congestion-Aware Load Balancing for Datacenters," SIGCOMM '14 Proceedings of the 2014 ACM Conference on SIGCOMM, Aug. 17- 22, 2014, pp. 503-514.

Amendment in Response to Office Action dated Nov. 18, 2019, from U.S. Appl. No. 16/031,921, filed Mar. 18, 2020, 16 pp.

Bakkum et al., "Accelerating SQL Database Operations on a GPU with CUDA," Proceedings of the 3rd Workshop on Genral-Purpose Computation on Graphics Processing Units, Mar. 14, 2010, 10 pp.

Banga et al., "Better operating system features for faster network servers," ACM Sigmetrics Performance Evaluation Review, vol. 26, Issue 3, Dec. 1998, 11 pp.

Barroso et al., "Attack of the killer Microseconds," Communications of the ACM, vol. 60, No. 4, Apr. 2017, 7 pp.

Benson et al., "MicroTE: Fine Grained Traffic Engineering for Data Centers," CoNEXT '11 Proceedings of the Seventh Conference on emerging Networking Experiments and Technologies Article No. 8, Dec. 6-9, 2011, 12 pp.

Benson et al., "Network Traffic Characteristics of Data Centers in the Wild," IMC '10 Proceedings of the 10th ACM SIGCOMM Conference on Internet Measurement, Nov. 1-30, 2010, pp. 267-280.

Deutsch, "Deflate Compressed Data Format Specification version 1.3," IETF Network Working Group, RFC 1951, May 1996, 15 pp.

Final Office Action from U.S. Appl. No. 16/031,921, dated Mar. 27, 2020, 48 pp.

Ford et al., "TCP Extensions for Multipath Operation with Multiple Addresses," Internet Engineering Task Force (IETF), RFC 6824, Jan. 2013, 64 pp.

Friedman et al., "Programming with Continuations," Technical Report 151, Nov. 1983, 14 pp.

Gay et al., "The nesC Language: A Holistic Approach to Networked Embedded Systems," accessed from http://nescc.sourceforge.net, last updated Dec. 14, 2004, 11 pp.

Halbwachs et al., "The Synchronous Data Flow Programming Language LUSTRE," Proceedings of the IEEE, vol. 79, No. 9, Sep. 1991, 16 pp.

Haynes et al., "Continuations and Coroutines," Technical Report No. 158, Jun. 1984, 19 pp.

Hewitt, "Viewing Control Structures as Patterns of Passing Messages," Massachusetts Institute of Technology, Artificial Intelligence Laboratory, Dec. 1976, 61 pp.

Hseush et al., Data Path Debugging: Data-Oriented Debugging for a Concurrent Programming Language, PADD 88 Proceedings of the 1988 ACM SIGPLAN and SIGOPS workshop on Parallel and distributed debugging, May 5-6, 1988, 12 pp.

Huang et al., "Erasure Coding in Windows Azure Storage," 2012 USENIX Annual Technical Conference, Jun. 13-15, 2012, 12 pp.

Hurson, "Advances in Computers, vol. 92," Jan. 13, 2014, Academic Press, XP055510879, 94-95 pp.

International Preliminary Report on Patentability from International Application No. PCT/US2018/041464, dated Jul. 10, 2019, 21 pp.

International Search Report and Written Opinion of International Application No. PCT/US2018/041464, dated Sep. 4, 2018, 13 pp.

Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.

Kahn et al., "Actors as a Special Case of Concurrent Constraint Programming," ECOOP/OOPSLA '90 Proceedings, Oct. 21-25, 1990, 10 pp.

Kaminow, "Optical Integrated Circuits: A Personal Perspective," Journal of Lightwave Technology, vol. 26, No. 9, May 1, 2008, pp. 994-1004.

Kandula et al., "Dynamic Load Balancing Without Packet Reordering," SIGCOMM Computer Communication Review, vol. 37, No. 2, Apr. 2007, pp. 53-62.

Kandula et al.,"The Nature of Datacenter Traffic: Measurements & Analysis," IMC '09 Proceedings of the 9th ACM SIGCOMM conference on Internet measurement, Nov. 4-6, 2009, pp. 202-208.

Kelly et al., A Block Diagram Compiler, The Bell System Technical Journal, Dec. 7, 1960, 10 pp.

Kounavis et al., "Programming the data path in network processor-based routers," Software—Practice and Experience, Oct. 21, 2003, 38 pp.

Larus et al., "Using Cohort Scheduling to Enhance Server Performance," Usenix Annual Technical Conference, Jun. 2002, 12 pp.

Levis et al., "Tiny OS: An Operating System for Sensor Networks," Ambient Intelligence, Jan. 2005, 34 pp.

Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.

Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.

Notice of Allowance from U.S. Appl. No. 16/031,676, dated Jan. 13, 2020, 16 pp.

Office Action from U.S. Appl. No. 16/031,921, dated Nov. 18, 2019, 39 pp.

Prosecution History from U.S. Appl. No. 15/939,227, dated Jun. 26, 2019 through Apr. 23, 2020, 66 pp.

Prosecution History from U.S. Appl. No. 16/031,945, dated Apr. 24, 2020 through Jun. 30, 2020, 40 pp.

Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.

Response to Written Opinion dated Sep. 4, 2018 from International Application No. PCT/US2018/041464, filed May 8, 2019, 21 pp.

Schroeder et al., "Flash Reliability in Production: The Expected and the Unexpected," 14th USENIX Conference on File and Storage Technologies (FAST '16), Feb. 22-25-2016, 15 pp.

U.S. Appl. No. 16/939,617, filed Jul. 27, 2020, naming inventors Sindhu et al.

Varela et al., "The Salsa Programming Language 2.0.0alpha Release Tutorial," Tensselaer Polytechnic Institute, Nov. 2009, 52 pp.

Von Behren et al., "Why Events Are A Bad Idea (for high-concurrency servers)," Proceedings of HotOS IX, May 2003, 6 pp.

Wang et al., "A Spatial and Temporal Locality-Aware Adaptive Cache Design with Network Optimization for Tiled Many-Core Architectures," IEEE Transactions on Very Large Scale Integration (VLSI) Systems, vol. 25. No. 9, Sep. 2017, pp. 2419-2433.

Welsh et al., "SEDA: An Architecture for Well-Conditioned, Scalable Internet Services," Eighteenth Symposium on Operating Systems Principles, Oct. 21-24, 2001, 14 pp.

Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.

Amendment in Response to Final Office Action dated Mar. 27, 2020 from U.S. Appl. No. 16/031,921, filed May 27, 2020, 17 pp.

Advisory Action from U.S. Appl. No. 16/901,991 dated Jun. 27, 2022, 5 pp.

(56) References Cited

OTHER PUBLICATIONS

Response to Final Office Action dated Mar. 28, 2022 from U.S. Appl. No. 16/901,991, filed Jun. 28, 2022, 10 pp.
Response to Final Office Action dated Mar. 28, 2022, from U.S. Appl. No. 16/901,991, filed May 31, 2022, 9 pp.
Final Office Action from U.S. Appl. No. 16/901,991, dated Mar. 28, 2022, 11 pp.
Notice of Allowance from U.S. Appl. No. 16/031,921, dated Dec. 14, 2021, 8 pp.
Office Action from U.S. Appl. No. 16/901,991, dated Nov. 3, 2021, 13 pp.
Response to Office Action dated Nov. 3, 2021, from U.S. Appl. No. 16/901,991, filed Feb. 2, 2022, 8 pp.
U.S. Appl. No. 17/657,081, filed Mar. 29, 2022, naming inventors Sindu et al.

* cited by examiner

ACCESS NODE FOR DATA CENTERS

CROSS REFERENCE

This application is a continuation application of and claims priority to U.S. patent application Ser. No. 16/031,676 filed on Jul. 10, 2018, now U.S. Pat. No. 10,659,254, which claims the benefit of U.S. Provisional Appl. No. 62/530,691, filed Jul. 10, 2017, and U.S. Provisional Appl. No. 62/559,021, filed Sep. 15, 2017. The entire content of all of these applications is hereby incorporated by reference.

TECHNICAL FIELD

This disclosure relates to computing devices for processing packets of information, for example, in the fields of networking and storage.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are always forwarded from the source to the destination along a single path through the routers and switches comprising the switching fabric.

Conventional compute nodes hosted by data centers typically include components such as a central processing unit (CPU), a graphics processing unit (GPU), random access memory, storage, and a network interface card (NIC), such as an Ethernet interface, to connect the compute node to a network, e.g., a data center switch fabric. Typical compute nodes are processor centric such that overall computing responsibility and control is centralized with the CPU. As such, the CPU performs processing tasks, memory management tasks such as shifting data between local caches within the CPU, the random access memory, and the storage, and networking tasks such as constructing and maintaining networking stacks, and sending and receiving data from external devices or networks. Furthermore, the CPU is also tasked with handling interrupts, e.g., from user interface devices. Demands placed on the CPU have continued to increase over time, although performance improvements in development of new CPUs have decreased over time. General purpose CPUs are normally not designed for high-capacity network and storage workloads, which are typically packetized. In general, CPUs are relatively poor at performing packet stream processing, because such traffic is fragmented in time and does not cache well. Nevertheless, server devices typically use CPUs to process packet streams.

SUMMARY

In general, this disclosure describes various example implementations of an access node that can be configured and optimized to perform input and output (I/O) tasks, such as storage and retrieval of data to and from storage devices (such as solid state drives), networking, data processing, and the like. For example, the access node may be configured to execute a large number of data I/O processing tasks relative to a number of instructions that are processed. As one example, the access node may be used to provide high-speed connectivity and I/O operations between and on behalf of application processors and storage components of a network, such as for providing interconnectivity between those devices and a switch fabric of a data center. As various examples, the access node may be provided as an integrated circuit mounted on a motherboard of a computing device, or installed on a card connected to the motherboard, such as via a Peripheral Component Interconnect-Express (PCI-e) bus, cable or the like.

The access node may be highly programmable such that the access node may expose hardware primitives for selecting and programmatically configuring data processing operations. For example, the access node may include hardware implementations of high-performance data processing tasks, such as cryptography, compression (including decompression), regular expression processing, lookup engines, or the like.

The access node may include a plurality of processing clusters that each include at least two processing cores for performing processing tasks (e.g., to process work units), a central cluster that schedules work among the various processing clusters, a networking unit, and/or one or more host units. Each of the processing cores in the processing clusters may be programmable using a high-level programming language, e.g., C, C++, or the like. The one or more host units of the access node may provide PCI-e bus lines, which can be coupled to the server devices and/or to storage devices, such as solid state drives (SSDs). The networking unit of the access node may communicatively couple the server devices to a network, such as a data center fabric, without the need for a separate network interface card (NIC). In addition, the networking unit may perform other tasks, such as Internet protocol security (IPsec), intrusion detection/prevention, firewall, encryption for secure sockets layer (SSL), or the like.

In one example, this disclosure is directed to a method comprising receiving, by an access node coupled to both a network and a plurality of network devices, data to be processed, wherein the access node includes a plurality of processing cores, a data network fabric, and a control network fabric, wherein the data network fabric is configured to communicate data between the plurality of processing cores, the network, and the plurality of network devices, and wherein the control network fabric is configured to communicate control messages between the plurality of processing cores, the network, and the plurality of network devices; receiving, by the access node and over the control network fabric, a work unit message indicating a processing task to be performed a processing core; and processing, by the access node, the work unit message, wherein processing the work unit message includes retrieving data associated with the work unit message over the data network fabric.

In another example, this disclosure is directed to an access node comprising: a network unit coupling the access node to a network; a host unit coupling the access node to host devices; processing circuitry for processing data; a data network fabric configured to communicate data between the processing circuitry, the network, and the plurality of host devices; and a control network fabric configured to communicate control messages between the processing circuitry, the network, and the plurality of host devices.

In a further example, this disclosure is directed to a system comprising a plurality of host devices, including at least one server device and at least one storage device; a network; and an access node comprising: a network unit coupling the access node to the network, a host unit coupling the access node to the plurality of host devices, processing circuitry for processing data, a data network fabric configured to communicate data between the processing circuitry, the network, and the plurality of host devices, and a control network fabric configured to communicate control messages between the processing circuitry, the network, and the plurality of host devices.

The details of one or more examples are set forth in the accompanying drawings and the description below. Other features, objects, and advantages will be apparent from the description and drawings, and from the claims.

DETAILED DESCRIPTION

Figure 1:
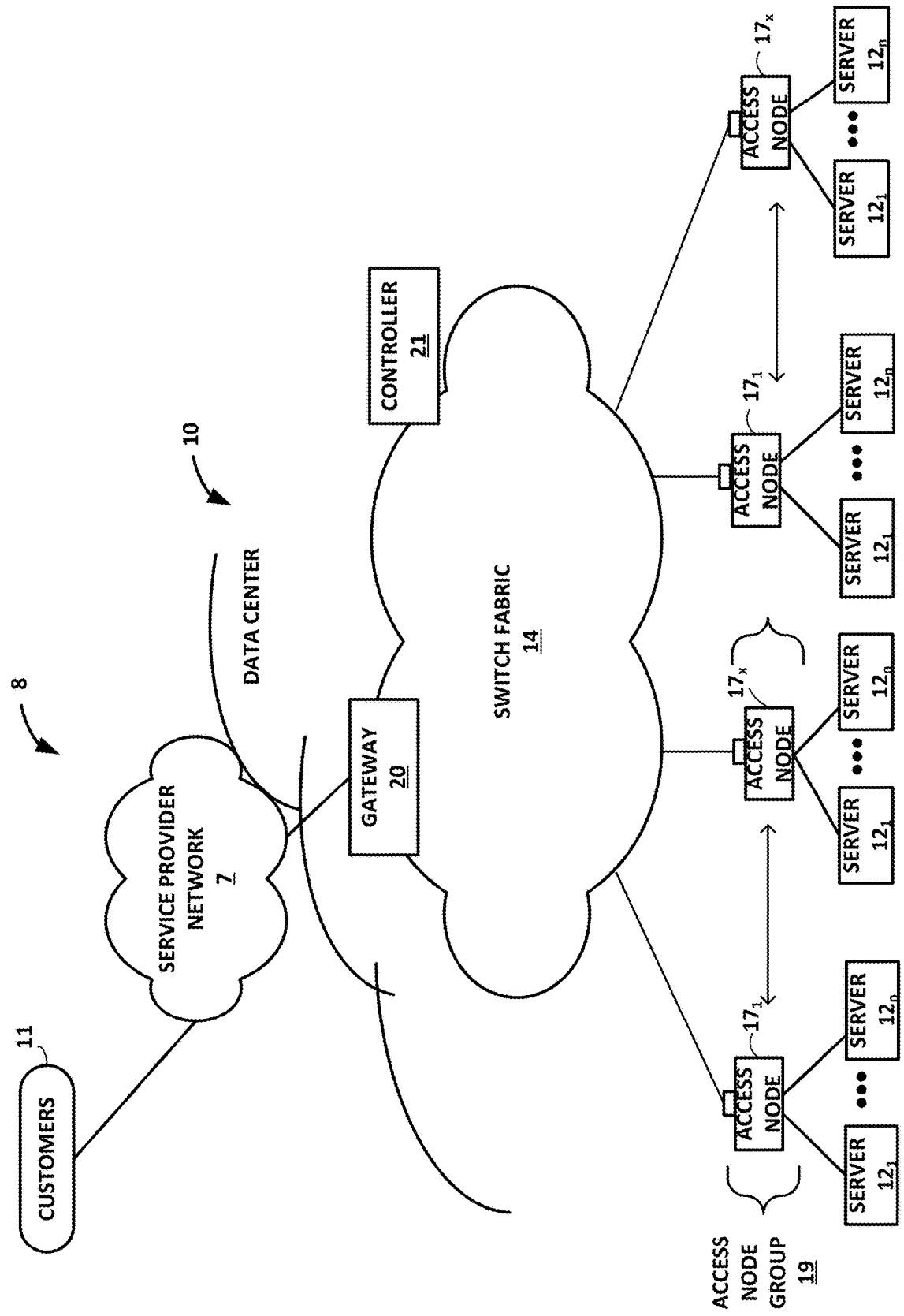
FIG. 1 is a block diagram illustrating an example network having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to data center 10 by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator.

In some examples, SDN controller 21 operates to configure access nodes 17 to logically establish one or more virtual fabrics as overlay networks dynamically configured on top of the physical underlay network provided by switch fabric 14, in accordance with the techniques described herein. For example, SDN controller 21 may learn and maintain knowledge of access nodes 21 and establish a communication control channel with each of the access nodes. SDN controller 21 uses its knowledge of access nodes 17 to define multiple sets (groups) of two of more access nodes 17 to establish different virtual fabrics over switch fabric 14. More specifically, SDN controller 21 may use the communication control channels to notify each of access nodes 17 for a given set which other access nodes are included in the same set. In response, access nodes 17 dynamically setup tunnels with the other access nodes included in the same set as a virtual fabric over switch fabric 14. In this way, SDN controller 21 defines the sets of access nodes 17 for each of the virtual fabrics, and the access nodes are responsible for establishing the virtual fabrics. As such, underlay components of switch fabric 14 may be unware of virtual fabrics. In these examples, access nodes 17 interface with and utilize switch fabric 14 so as to provide full mesh (any-to-any) interconnectivity between access nodes of any given virtual fabric. In this way, the servers connected to any of the access nodes forming a given one of virtual fabrics may communicate packet data for a given packet flow to any other of the servers coupled to the access nodes for that virtual fabric using any of a number of parallel data paths within switch fabric 14 that interconnect the access nodes of that virtual fabric. More details of access nodes operating to spray packets within and across virtual overlay networks are available in U.S. Provisional Patent Application No. 62/638,788, filed Mar. 5, 2018, entitled "Network Access Node Virtual Fabrics Configured Dynamically over an Underlay Network," the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17. As further described herein, in one example, each access node 17 is a highly programmable I/O processor specially designed for offloading certain functions from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers.

Access nodes 17 may also be referred to as data processing units (DPUs), or devices including DPUs. In other words, the term access node may be used herein interchangeably with the term DPU. Additional example details of various example DPUs are described in U.S. Provisional Patent Application No. 62/530,691, filed Jul. 10, 2017, entitled "Data Processing Unit for Computing Devices," the entire content of which is incorporated herein by reference.

In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$-$17_x$. As such, multiple access nodes 17 may be grouped (e.g., within a single electronic device or network appliance), referred to herein as an access node group 19, for providing services to a group of servers supported by the set of access nodes internal to the device. In one example, an access node group 19 may comprise four access nodes 17, each supporting four servers so as to support a group of sixteen servers.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers).

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

According to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. Example network architectures and techniques are described in which access nodes, in example implementations, spray individual packets for packet flows between the access nodes and across some or all of the multiple parallel data paths in the data center switch fabric 14 and reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide any of the advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

The techniques may provide certain advantages. For example, the techniques may increase significantly the bandwidth utilization of the underlying switch fabric 14. Moreover, in example implementations, the techniques may provide full mesh interconnectivity between the servers of the data center and may nevertheless be non-blocking and drop-free.

Although access nodes 17 are described in FIG. 1 with respect to switch fabric 14 of data center 10, in other examples, access nodes may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the access nodes. The packet switched network may use any technology, including IP over Ethernet as well as other technologies. Irrespective of the type of packet switched network, in accordance with the techniques described in this disclosure, access nodes may spray individual packets for packet flows between the access nodes and across multiple parallel data paths in the packet switched network and reorder the packets for delivery to the destinations so as to provide full mesh connectivity.

Figure 2:
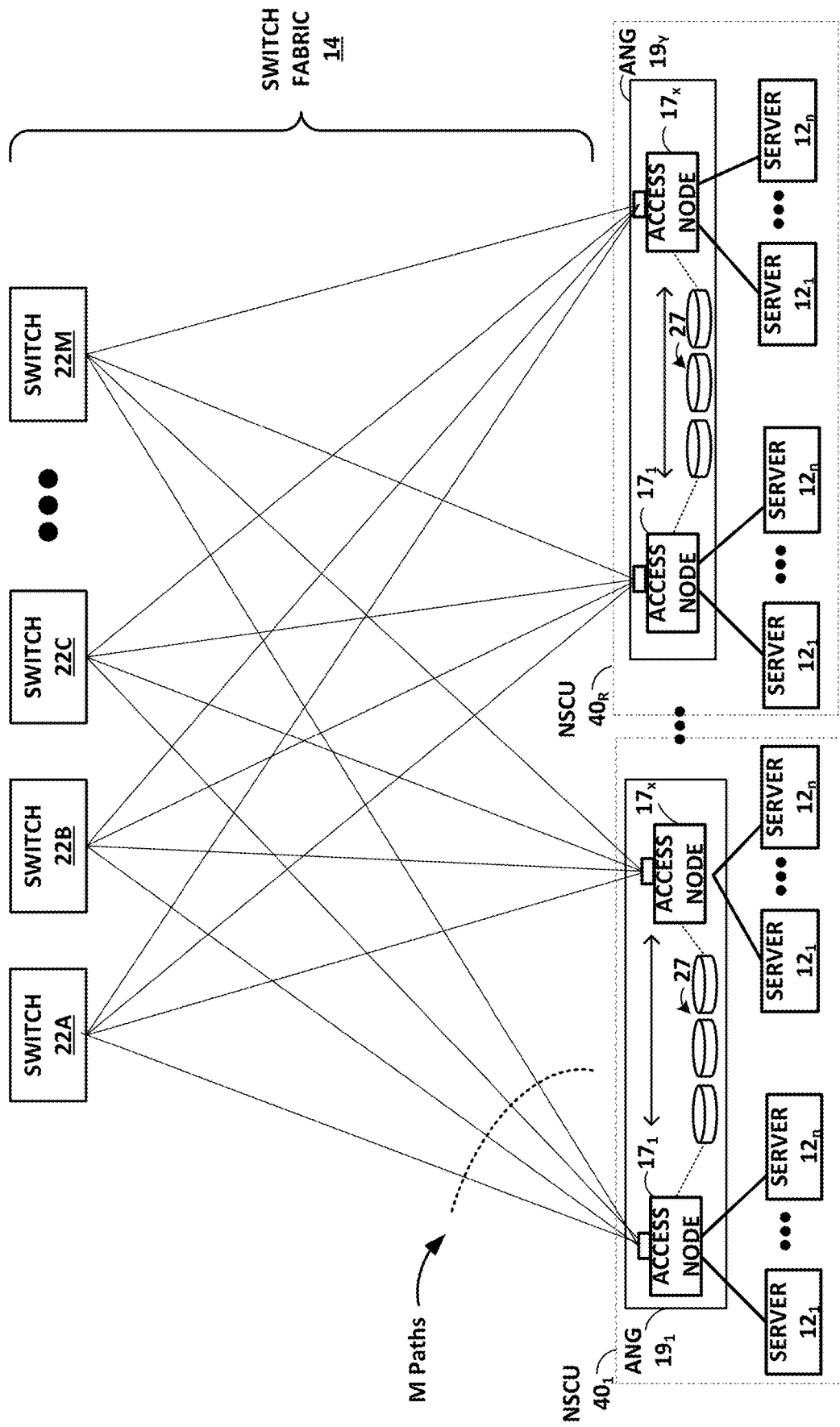
FIG. 2 is a block diagram illustrating in further detail the logical interconnectivity provided by access nodes and switch fabric within a data center.

FIG. 2 is a block diagram illustrating in further detail the logical interconnectivity provided by access nodes 17 and switch fabric 14 within the data center. As shown in this example, access nodes 17 and switch fabric 14 may be configured to provide full mesh interconnectivity such that access nodes 17 may communicate packet data for any of servers 12 to any other of the servers 12 using any of a number of M parallel data paths to any of core switches 22A-22M (collectively "core switches 22"). Moreover, according to the techniques described herein, access nodes 17 and switch fabric 14 may be configured and arranged in a way such that the M parallel data paths in switch fabric 14 provide reduced L2/L3 hops and full mesh interconnections (e.g., bipartite graph) between servers 12, even in massive data centers having tens of thousands of servers. Note that in this example, switches 22 are not connected to each other, which makes it much more likely that any failure of one or more of the switches will be independent of each other. In other examples, the switch fabric itself may be implemented using multiple layers of interconnected switches as in a CLOS network.

In some example implementations, each access node 17 may, therefore, have multiple parallel data paths for reaching any given other access node 17 and the servers 12 reachable through those access nodes. In some examples, rather than being limited to sending all of the packets of a given flow along a single path in the switch fabric, switch fabric 14 may be configured such that access nodes 17 may, for any given packet flow between servers 12, spray the packets of the packet flow across all or a subset of the M parallel data paths of switch fabric 14 by which a given destination access node 17 for a destination server 12 can be reached.

According to the disclosed techniques, access nodes 17 may spray the packets of individual packet flows across the M paths end-to-end forming a virtual tunnel between a source access node and a destination access node. In this way, the number of layers included in switch fabric 14 or the number of hops along the M parallel data paths, may not matter for implementation of the packet spraying techniques described in this disclosure.

The technique of spraying packets of individual packet flows across all or a subset of the M parallel data paths of switch fabric 14, however, enables the number of layers of network devices within switch fabric 14 to be reduced, e.g., to a bare minimum of one. Further, it enables fabric architectures in which the switches are not connected to each other, reducing the likelihood of failure dependence between two switches and thereby increasing the reliability of the switch fabric. Flattening switch fabric 14 may reduce cost by eliminating layers of network devices that require power and reduce latency by eliminating layers of network devices that perform packet switching. In one example, the flattened topology of switch fabric 14 may result in a core layer that includes only one level of spine switches, e.g., core switches 22, that may not communicate directly with one another but form a single hop along the M parallel data paths. In this example, any access node 17 sourcing traffic into switch fabric 14 may reach any other access node 17 by a single, one-hop L3 lookup by one of core switches 22.

An access node 17 sourcing a packet flow for a source server 12 may use any technique for spraying the packets across the available parallel data paths, such as available bandwidth, random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (five tuple) sourced by a server 12 to traverse different paths of switch fabric 14 between access nodes 17 coupled to the source and destinations servers. The respective destination access node 17 associated with the destination server 12 may be configured to reorder the variable length IP packets of the packet flows and deliver the packets to the destination server in the sequence in which they were sent.

In some example implementations, each access node 17 implements at least four different operational networking components or functions: (1) a source component operable to receive traffic from server 12, (2) a source switching component operable to switch source traffic to other source switching components of different access nodes 17 (possibly of different access node groups) or to core switches 22, (3) a destination switching component operable to switch inbound traffic received from other source switching components or from cores switches 22 and (4) a destination component operable to reorder packet flows and provide the packet flows to destination servers 12.

In this example, servers 12 are connected to source components of the access nodes 17 to inject traffic into the switch fabric 14, and servers 12 are similarly coupled to the destination components within the access nodes 17 to receive traffic therefrom. Because of the full-mesh, parallel data paths provided by switch fabric 14, each source switching component and destination switching component within a given access node 17 need not perform L2/L3 switching. Instead, access nodes 17 may apply spraying algorithms to spray packets of a packet flow, e.g., available bandwidth, randomly, round-robin, based on QoS/scheduling or otherwise to efficiently forward packets without, in some examples, requiring packet analysis and lookup operations.

Destination switching components of access nodes 17 may provide a limited lookup necessary only to select the proper output port for forwarding packets to local servers 12. As such, with respect to full routing tables for the data center, only core switches 22 may need to perform full lookup operations. Thus, switch fabric 14 provides a highly-scalable, flat, high-speed interconnect in which servers 12 are, in some embodiments, effectively one L2/L3 hop from any other server 12 within the data center.

Access nodes 17 may need to connect to a fair number of core switches 22 in order to communicate packet data to any other of access nodes 17 and the servers 12 accessible through those access nodes. In some cases, to provide a link multiplier effect, access nodes 17 may connect to core switches 22 via top of rack (TOR) Ethernet switches, electrical permutation devices, or optical permutation (OP) devices (not shown in FIG. 2). To provide an additional link multiplier effect, source components of the access nodes 17 may be configured to spray packets of individual packet flows of the traffic received from server 12 across a set of the other access nodes 17 included in one or more access node groups 19. In one example, access node 17 may achieve an 8× multiplier effect from inter-access node spraying, and an additional 8× multiplier effect from OP devices to connect to up to sixty-four core switches 22.

Flow-based routing and switching over Equal Cost Multi-Path (ECMP) paths through a network may be susceptible to highly variable load-dependent latency. For example, the network may include many small bandwidth flows and a few large bandwidth flows. In the case of routing and switching over ECMP paths, the source access node may select the same path for two of the large bandwidth flows leading to large latencies over that path. In order to avoid this issue and keep latency low across the network, an administrator may be forced to keep the utilization of the network below 25-30%, for example. The techniques described in this disclosure of configuring access nodes 17 to spray packets of individual packet flows across all available paths enables higher network utilization, e.g., 85-90%, while maintaining bounded or limited latencies. The packet spraying techniques enable a source access node 17 to fairly distribute packets of a given flow across all the available paths while taking link failures into account. In this way, regardless of the bandwidth size of the given flow, the load can be fairly spread across the available paths through the network to avoid over utilization of a particular path. The disclosed techniques enable the same amount of networking devices to pass three times the amount of data traffic through the network while maintaining low latency characteristics and reducing a number of layers of network devices that consume energy.

As shown in the example of FIG. 2, in some example implementations, access nodes 17 may be arranged into multiple different access node groups $19_1$-$19_Y$ (ANGs in FIG. 2), each including any number of access nodes 17 up to, for example, x access nodes $17_1$-$17_x$. As such, multiple access nodes 17 may be grouped and arranged (e.g., within a single electronic device or network appliance), referred to herein as an access node group (ANG) 19, for providing services to a group of servers supported by the set of access nodes internal to the device.

As described, each access node group 19 may be configured as standalone network device, and may be implemented as a device configured for installation within a compute rack, a storage rack or a converged rack. In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as high-speed solid-state hard drives, configured to provide network accessible storage for use by applications executing on the servers. Each access node group 19 including its set of access nodes 17, storage devices 27, and the set of servers 12 supported by the access nodes 17 of that access node group may be referred to herein as a network storage compute unit (NSCU) 40.

Figure 3:
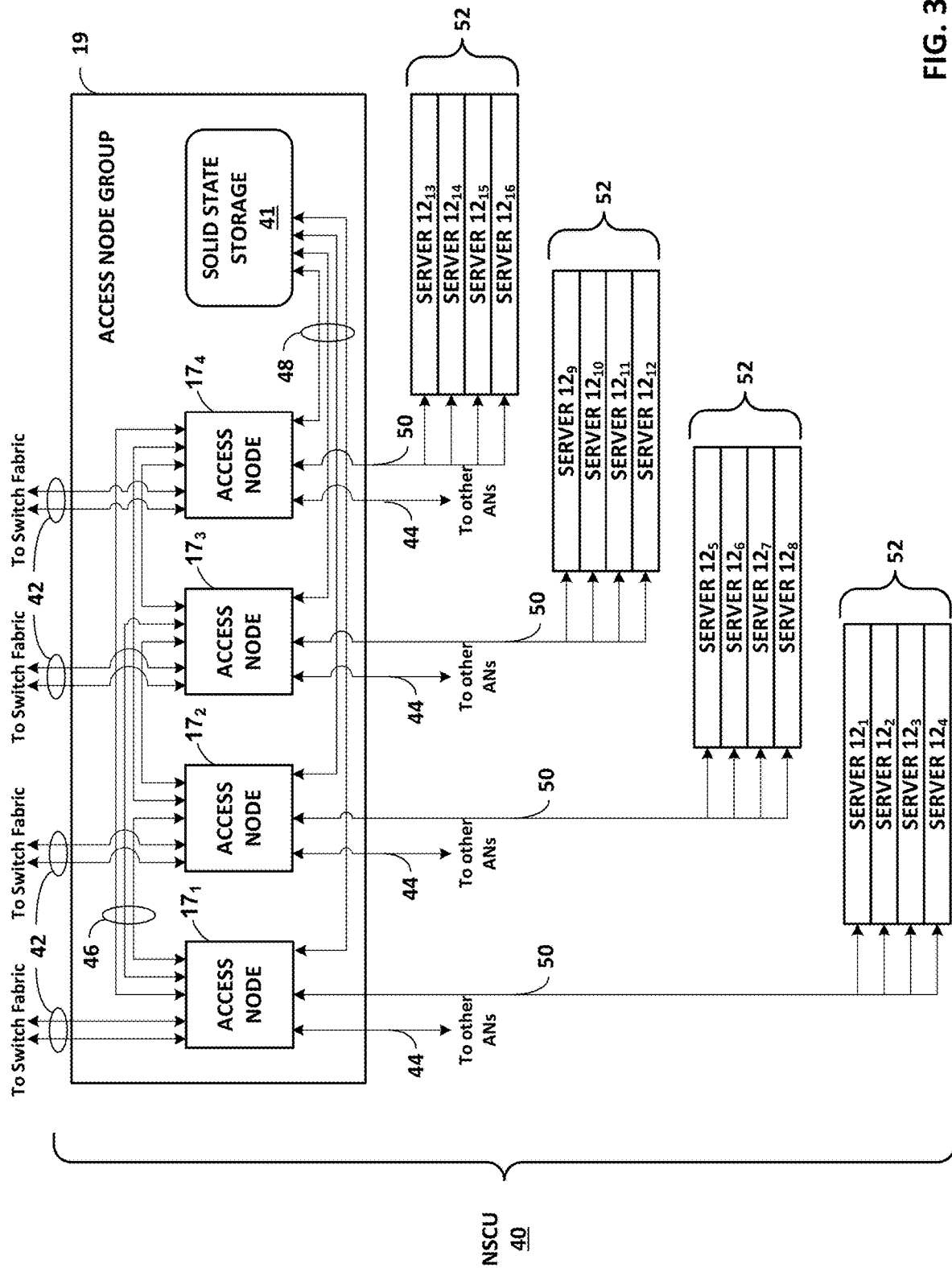
FIG. 3 is a block diagram illustrating one example of network storage compute unit (NSCU) 40 including an access node group and its supported servers.

FIG. 3 is a block diagram illustrating one example of network storage compute unit (NSCU) 40 including an access node group 19 and its supported servers 52. Access node group 19 may be configured to operate as a high-performance I/O hub designed to aggregate and process network and storage I/O to multiple servers 52. In the particular example of FIG. 3, access node group 19 includes four access nodes $17_1$-$17_4$ (collectively, "access nodes 17") connected to a pool of local solid state storage 41. In the illustrated example, access node group 19 supports a total of sixteen server nodes $12_1$-$12_{16}$ (collectively, "server nodes 12") with each of the four access nodes 17 within access node group 19 supporting four of server nodes 12. In some examples, each of the four server nodes 12 supported by each of the access nodes 17 may be arranged as a server 52. In some examples, the "servers 12" described throughout this application may be dual-socket or dual-processor "server nodes" that are arranged in groups of two or more within a standalone server device, e.g., servers 52.

Although access node group 19 is illustrated in FIG. 3 as including four access nodes 17 that are all connected to a single pool of solid state storage 41, an access node group may be arranged in other ways. In one example, each of the four access nodes 17 may be included on an individual access node sled that also includes solid state storage and/or other types of storage for the access node. In this example, an access node group may include four access node sleds each having an access node and a set of local storage devices.

In one example implementation, access nodes 17 within access node group 19 connect to servers 52 and solid state storage 41 using Peripheral Component Interconnect express (PCIe) links 48, 50, and connect to other access nodes and the datacenter switch fabric 14 using Ethernet links 42, 44, 46. For example, each of access nodes 17 may support six high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17 in the same access node group 19. In one example, each of externally-available connections 42 may be a 100 Gigabit Ethernet (GE) connection. In this example, access node group 19 has 8×100 GE externally-available ports to connect to the switch fabric 14.

Within access node group 19, connections 42 may be copper, i.e., electrical, links arranged as 8×25 GE links between each of access nodes 17 and optical ports of access node group 19. Between access node group 19 and the switch fabric, connections 42 may be optical Ethernet connections coupled to the optical ports of access node group 19. The optical Ethernet connections may connect to one or more optical devices within the switch fabric, e.g., optical permutation devices. The optical Ethernet connections may support more bandwidth than electrical connections without increasing the number of cables in the switch fabric. For example, each optical cable coupled to access node group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of access nodes 17 include one Ethernet connection 44 for communication with other access nodes within other access node groups, and three Ethernet connections 46 for communication with the other three access nodes within the same access node group 19. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two AGNs 19 and supports an 8-way mesh of eight access nodes 17 for those AGNs. In this particular example, connections 46 would provide full-mesh connectivity between the four access nodes 17 within the same access node group 19, and connections 44 would provide full-mesh connectivity between each of access nodes 17 and four other access nodes within one other access node group of the logical rack (i.e., structural unit). In addition, access node group 19 may have enough, e.g., sixteen, externally-available Ethernet ports to connect to the four access nodes in the other access node group.

In the case of an 8-way mesh of access nodes, i.e., a logical rack of two NSCUs 40, each of access nodes 17 may be connected to each of the other seven access nodes by a 50 GE connection. For example, each of connections 46 between the four access nodes 17 within the same access node group 19 may be a 50 GE connection arranged as 2×25 GE links. Each of connections 44 between the four access nodes 17 and the four access nodes in the other access node group may include four 50 GE links. In some examples, each of the four 50 GE links may be arranged as 2×25 GE links such that each of connections 44 includes 8×25 GE links to the other access nodes in the other access node group. This example is described in more detail below with respect to FIG. 5.

In another example, Ethernet connections 44, 46 provide full-mesh connectivity between access nodes within a given structural unit that is a full-rack or a full physical rack that includes four NSCUs 40 having four AGNs 19 and supports a 16-way mesh of access nodes 17 for those AGNs. In this example, connections 46 provide full-mesh connectivity between the four access nodes 17 within the same access node group 19, and connections 44 provide full-mesh connectivity between each of access nodes 17 and twelve other access nodes within three other access node group. In addition, access node group 19 may have enough, e.g., forty-eight, externally-available Ethernet ports to connect to the four access nodes in the other access node group.

In the case of a 16-way mesh of access nodes, each of access nodes 17 may be connected to each of the other fifteen access nodes by a 25 GE connection, for example. In other words, in this example, each of connections 46 between the four access nodes 17 within the same access node group 19 may be a single 25 GE link. Each of connections 44 between the four access nodes 17 and the twelve other access nodes in the three other access node groups may include 12×25 GE links.

As shown in FIG. 3, each of access nodes 17 within an access node group 19 may also support a set of high-speed PCIe connections 48, 50, e.g., PCIe Gen 3.0 or PCIe Gen 4.0 connections, for communication with solid state storage 41 within access node group 19 and communication with servers 52 within NSCU 40. Each of servers 52 includes four server nodes 12 supported by one of access nodes 17 within access node group 19. Solid state storage 41 may be a pool of Non-Volatile Memory express (NVMe)-based solid state drive (SSD) storage devices accessible by each of access nodes 17 via connections 48.

In one example, solid state storage 41 may include twenty-four SSD devices with six SSD devices for each of access nodes 17. The twenty-four SSD devices may be arranged in four rows of six SSD devices with each row of SSD devices being connected to one of access nodes 17. Each of the SSD devices may provide up to 16 Terabytes (TB) of storage for a total of 384 TB per access node group 19. As described in more detail below, in some cases, a physical rack may include four access node groups 19 and their supported servers 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the access nodes 17 is included on an individual access node sled with local storage for the access node, each of the access node sleds may include four SSD devices and some additional storage that may be hard drive or solid state drive devices. In this example, the four SSD devices and the additional storage may provide approximately the same amount of storage per access node as the six SSD devices described in the previous example.

In one example, each of access nodes 17 supports a total of 96 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×16-lane PCIe Gen 3.0 connection. In this example, access node group 19 has a total of 256 external facing PCIe links that interface with servers 52. In some scenarios, access nodes 17 may support redundant server connectivity such that each of access nodes 17 connects to eight server nodes 12 within two different servers 52 using an 8×8-lane PCIe Gen 3.0 connection.

In another example, each of access nodes 17 supports a total of 64 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×8-lane PCIe Gen 4.0 connection. In this example, access node group 19 has a total of 128 external facing PCIe links that interface with servers 52.

Figure 4:
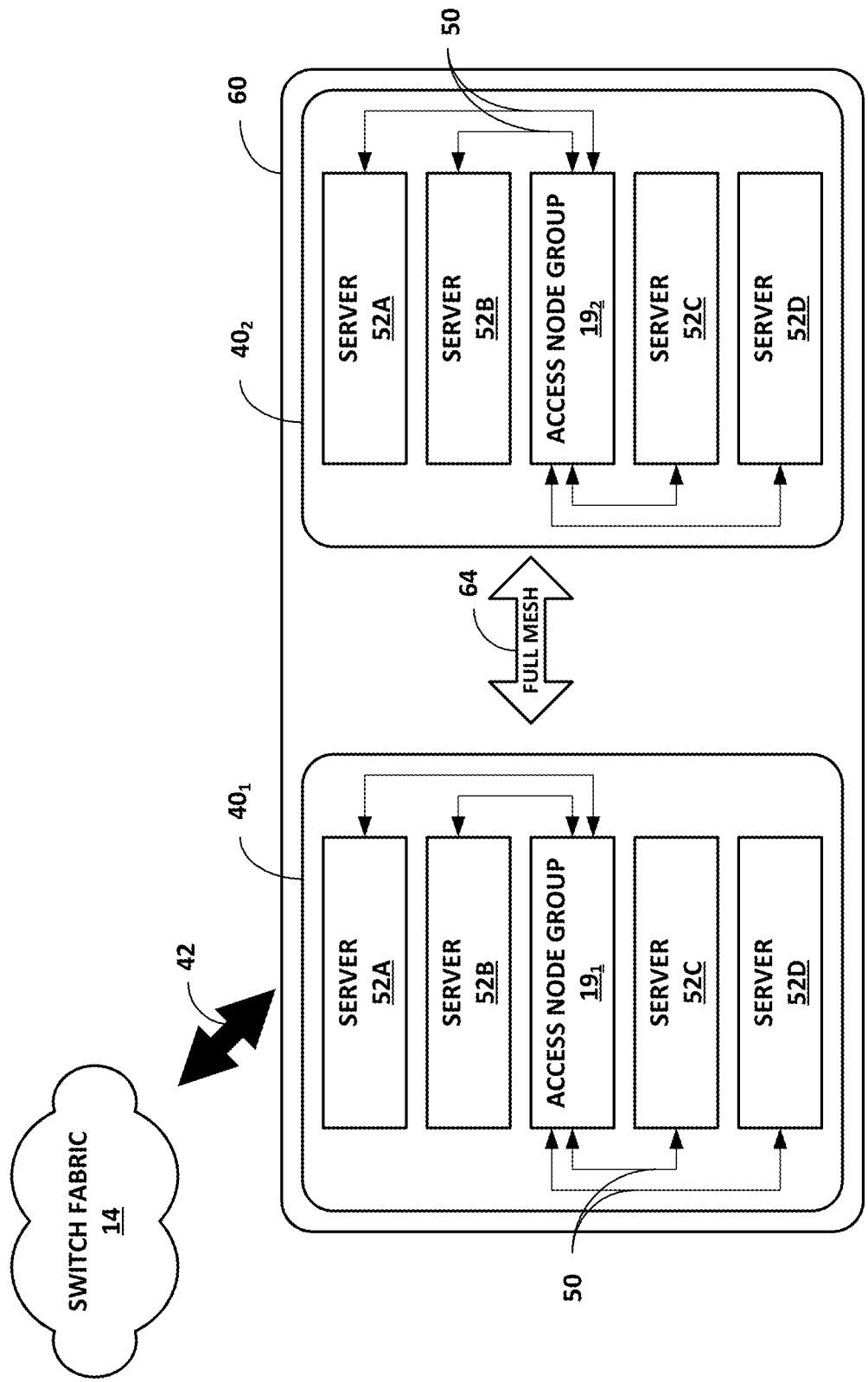
FIG. 4 is a block diagram illustrating an example logical rack arrangement including two NSCUs from FIG. 3.

FIG. 4 is a block diagram illustrating an example logical rack arrangement 60 including two NSCUs $40_1$ and $40_2$ from FIG. 3. In some examples, each of NSCUs 40 may be referred to as a "compute sandwich" based on the structural arrangement of access node group 19 "sandwiched" between two servers 52 on the top and two servers 52 on the bottom. For example, server 52A may be referred to as a top second server, server 52B may be referred to as a top server, server 52C may be referred to as a bottom server, and server 52D may be referred to as a bottom second server. Each of servers 52 may include four server nodes, and each server node may be a dual-socket or dual-processor server sled.

Each of access node groups 19 connects to servers 52 using PCIe links 50, and to switch fabric 14 using Ethernet links 42. Access node groups $19_1$ and $19_2$ may each include four access nodes connected to each other using Ethernet links and local solid state storage connected to the access nodes using PCIe links as described above with respect to FIG. 3. The access nodes within access node groups $19_1$ and $19_2$ are connected to each other in a full mesh 64, which is described in more detail with respect to FIG. 5.

In addition, each of access node groups 19 supports PCIe connections 50 to servers 52. In one example, each of connections 50 may be a 4×16-lane PCIe Gen 3.0 connection such that access node group 19 has a total of 256 externally-available PCIe links that interface with servers 52. In another example, each of connections 50 may be a 4×8-lane PCIe Gen 4.0 connection for communication between access nodes within access node group 19 and server nodes within servers 52. In either example, connections 50 may provide a raw throughput of 512 Gigabits per access node 19 or approximately 128 Gigabits of bandwidth per server node without accounting for any overhead bandwidth costs.

As discussed above with respect to FIG. 3, each of NSCUs 40 supports 8×100 GE links 42 from access node group 19 to switch fabric 14. Each of NSCUs 40 thus provides support for up to sixteen server nodes in four servers 52, local solid state storage, and 800 Gbps of full duplex (i.e., bidirectional) network bandwidth. Each of access node groups 19 may, therefore, provide true hyper-convergence of compute, storage, networking and security of servers 52. Logical rack 60, including two NSCUs 40, therefore, provides support for up to thirty-two server nodes in eight servers 52, local solid state storage at access node groups 19, and 16×100 GE links 42 to switch fabric 14, which results in 1.6 Terabits per second (Tbps) of full duplex network bandwidth.

Figure 5:
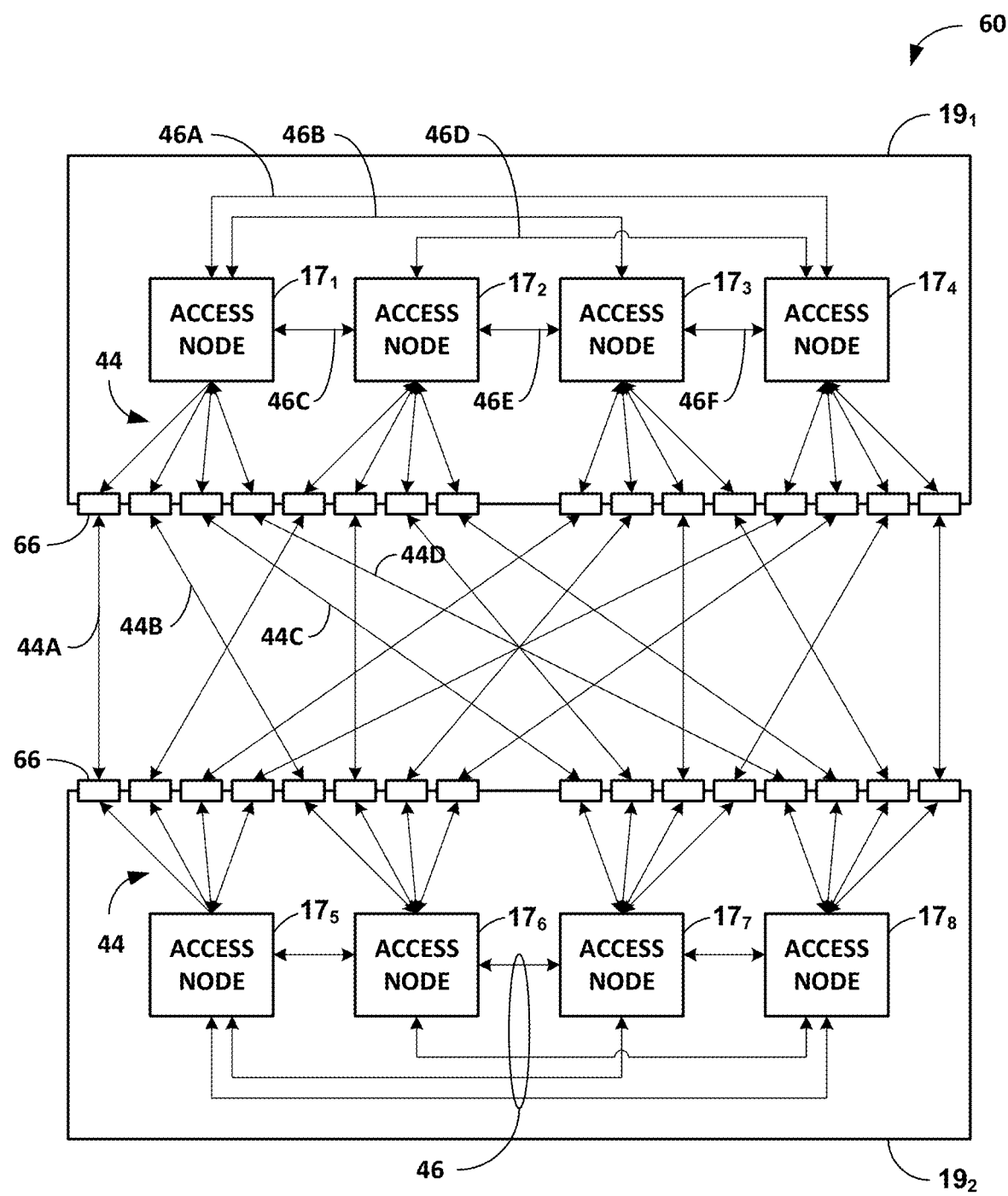
FIG. 5 is a block diagram illustrating an example of full mesh connectivity between two access node groups within a logical rack.

FIG. 5 is a block diagram illustrating an example of full mesh connectivity between two access node groups $19_1$, $19_2$ within a logical rack 60. As illustrated in FIG. 5, access node group $19_1$ includes four access nodes $17_1$-$17_4$ and access node group $19_2$ also include four access nodes $17_5$-$17_8$. Each of access nodes 17 connects to the other access nodes within the logical rack in a mesh fabric topology. The eight access nodes 17 included in the mesh topology may be referred to as an access node "cluster." In this way, each of access nodes 17 is able to spray incoming packets to each of the other access nodes in the cluster.

In the illustrated configuration of an 8-way mesh interconnecting two access node groups 19, each access node 17 connects via full mesh connectivity to each of the other seven access nodes in the cluster. The mesh topology between access nodes 17 includes intra-access node group links 46 between the four access nodes included in the same access node group 19, and inter-access node group links 44 between access nodes $17_1$-$17_4$ in access node group $19_1$ and access nodes $17_5$-$17_8$ in access node group $19_2$. Although illustrated as a single connection between each of access nodes 17, each of connections 44, 46 are bidirectional such that each access node connects to each other access node in the cluster via a separate link.

Each of access nodes $17_1$-$17_4$ within first access node group $19_1$ has three intra-access node group connections 46 to the other access nodes in first access node group $19_1$. As illustrated in first access node group $19_1$, access node $17_1$ supports connection 46A to access node $17_4$, connection 46B to access node $17_3$, and connection 46C to access node $17_2$. Access node $17_2$ supports connection 46A to access node $17_1$, connection 46D to access node $17_4$, and connection 46E to access node $17_3$. Access node $17_3$ supports connection 46B to access node $17_1$, connection 46E to access node $17_2$, and connection 46F to access node $17_4$. Access node $17_4$ supports connection 46A to access node $17_1$, connection 46D to access node $17_2$, and connection 46F to access node $17_3$. The access nodes $17_5$-$17_8$ are similarly connected within second access node group $19_2$.

Each of access nodes $17_1$-$17_4$ within first access node group $19_1$ also has four inter-access node group connections 44 to the access nodes $17_5$-$17_8$ in second access node group $19_2$. As illustrated in FIG. 5, first access node group $19_1$ and second access node group $19_2$ each has sixteen externally-available ports 66 to connect to each other. For example, access node $17_1$ supports connections 44A, 44B, 44C, and 44D through four external facing ports 66 of first access node group $19_1$ to four externally-available ports 66 of second access node group $19_2$ to reach access nodes $17_5$-$17_8$. Specifically, access node $17_1$ supports connection 44A to access node $17_5$ within second access node group $19_2$, connection 44B to access node $17_6$ within second access node group $19_2$, connection 44C to access node $17_7$ within second access node group $19_2$, and connection 44D to access node $17_8$ within second access node group $19_2$. The remaining access nodes $17_2$-$17_4$ within first access node group $19_1$ are similarly connected to access nodes $17_5$-$17_8$ within second access node group $19_2$. In addition, in the reverse direction, the access nodes $17_5$-$17_8$ are similarly connected to access nodes $17_1$-$17_4$ within first access node group $19_1$.

Each of access nodes 17 may be configured to support up to 400 Gigabits of bandwidth to connect to other access nodes in the cluster. In the illustrated example, each of access nodes 17 may support up to eight 50 GE links to the other access nodes. In this example, since each of access nodes 17 only connects to seven other access nodes, 50 Gigabits of bandwidth may be leftover and used for managing the access node. In some examples, each of connections 44, 46 may be single 50 GE connections. In other examples, each of connections 44, 46 may be 2×25 GE connections. In still other examples, each of intra-access node group connections 46 may be 2×25 GE connections, and each of inter-access node group connections 44 may be single 50 GE connections to reduce a number of inter-box cables. For example, from each access node $17_1$-$17_4$ within first access node group $19_1$, 4×50 GE links go off box to connect to access nodes $17_5$-$17_8$ in second access node group $19_2$. In some examples, the 4×50 GE links may be taken out from each of the access nodes 17 using DAC cables.

Figure 6:
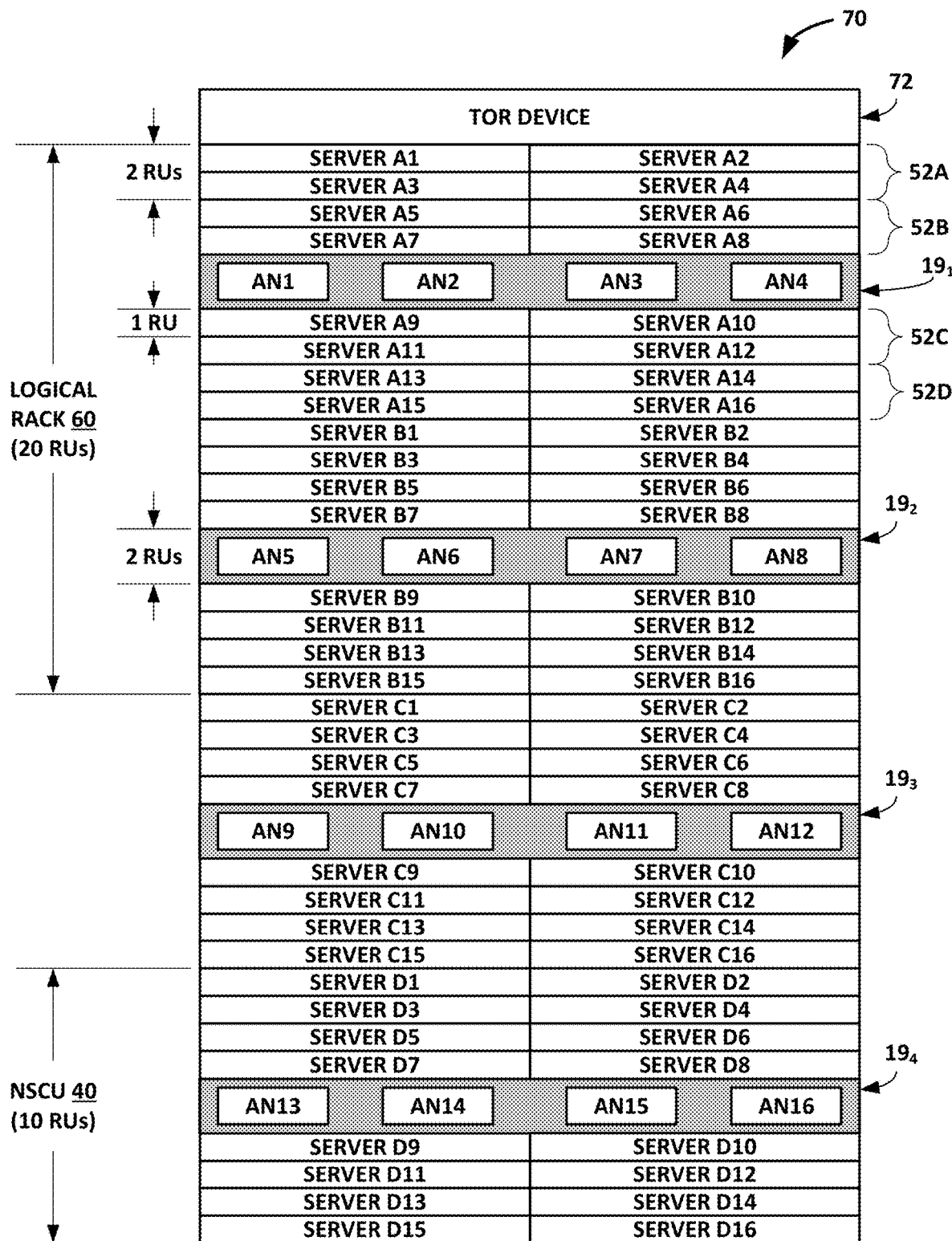
FIG. 6 is a block diagram illustrating an example arrangement of a full physical rack including two logical racks from FIG. 4.

FIG. 6 is a block diagram illustrating an example arrangement of a full physical rack 70 including two logical racks 60 from FIG. 4. In the illustrated example of FIG. 6, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor. In some examples, rack 70 may not include an additional TOR device 72 and instead have the typical 40 rack units.

In the illustrated example, rack 70 includes four access node groups $19_1$-$19_4$ that are each separate network appliances 2RU in height. Each of the access node groups 19 includes four access nodes and may be configured as shown in the example of FIG. 3. For example, access node group $19_1$ includes access nodes AN1-AN4, access node group $19_2$ includes access nodes AN5-AN8, access node group $19_3$ includes access nodes AN9-AN12, and access node group $19_4$ includes access nodes AN13-AN16. Access nodes AN1-AN16 may be substantially similar to access nodes 17 described above.

In this example, each of the access node groups 19 supports sixteen server nodes. For example, access node group $19_1$ supports server nodes A1-A16, access node group $19_2$ supports server nodes B1-B16, access node group $19_3$ supports server nodes C1-C16, and access node group $19_4$ supports server nodes D1-D16. A server node may be a dual-socket or dual-processor server sled that is ½Rack in width and 1RU in height. As described with respect to FIG. 3, four of the server nodes may be arranged into a server 52 that is 2RU in height. For example, server 52A includes server nodes A1-A4, server 52B includes server nodes A5-A8, server 52C includes server nodes A9-A12, and server 52D includes server nodes A13-A16. Server nodes B1-B16, C1-C16, and D1-D16 may be similarly arranged into servers 52.

Access node groups 19 and servers 52 are arranged into NSCUs 40 from FIGS. 3-4. NSCUs 40 are 10RU in height and each include one 2RU access node group 19 and four 2RU servers 52. As illustrated in FIG. 6, access node groups 19 and servers 52 may be structured as a compute sandwich, in which each access node group 19 is "sandwiched" between two servers 52 on the top and two servers 52 on the bottom. For example, with respect to access node group $19_1$, server 52A may be referred to as a top second server, server 52B may be referred to as a top server, server 52C may be referred to as a bottom server, and server 52D may be referred to as a bottom second server. In the illustrated structural arrangement, access node groups 19 are separated by eight rack units to accommodate the bottom two 2RU servers 52 supported by one access node group and the top two 2RU servers 52 supported by another access node group.

NSCUs 40 may be arranged into logical racks 60, i.e., half physical racks, from FIG. 5. Logical racks 60 are 20RU in height and each include two NSCUs 40 having full mesh connectivity. In the illustrated example of FIG. 6, access node group $19_1$ and access node group $19_2$ are included in the same logical rack 60 along with their respective supported server nodes A1-A16 and B1-B16. As described in more detail above with respect to FIG. 5, access nodes AN1-AN8 included the same logical rack 60 are connected to each other in an 8-way mesh. Access nodes AN9-AN16 may be similarly connected in an 8-way mesh within another logical rack 60 includes access nodes groups $19_3$ and $19_4$ along with their respective server nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between access nodes 17 and core switches 22 and that is configured such that optical communications are "permuted" based on wavelength so as to provide full-mesh connectivity between the upstream and downstream ports without any optical interference.

In the illustrated example, each of the access node groups 19 may connect to TOR device 72 via one or more of the 8×100 GE links supported by the access node group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 may not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four server nodes and the four access node groups. For example, each of the access node groups 19 may use approximately 1 kW of power resulting in approximately 4 kW of power for access node groups. In addition, each of the server nodes may use approximately 200 W of power resulting in around 12.8 kW of power for servers 52. In this example, the 40RU arrangement of access node groups 19 and servers 52, therefore, uses around 16.8 kW of power.

Figure 7A:
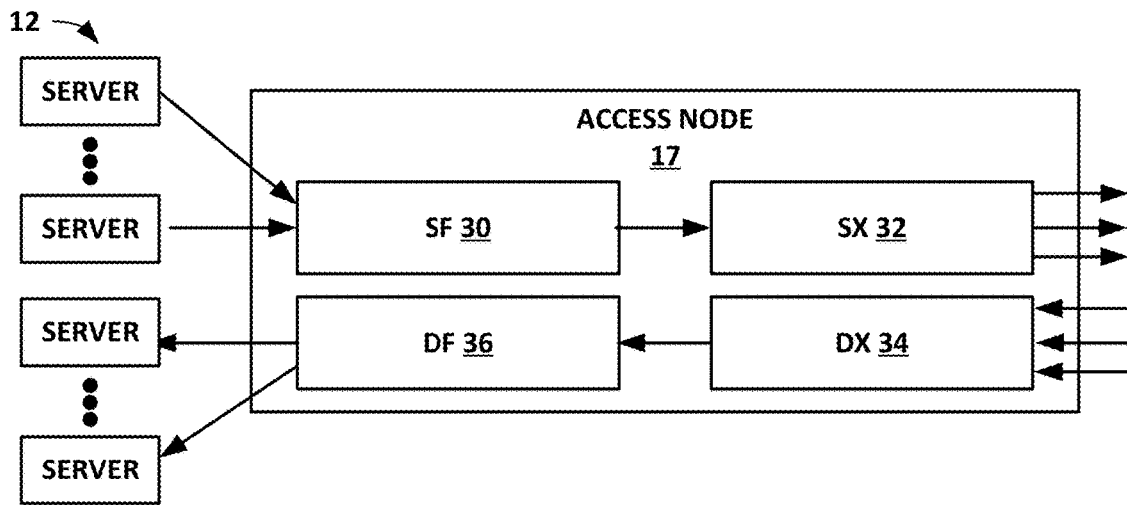
FIG. 7A is a block diagram showing a logical view of the networking data paths and operations within an access node.

FIG. 7A is a block diagram showing a logical view of the networking data paths and operations within an access node 17. As shown in the example of FIG. 7A, in some example implementations, each access node 17 implements at least four different operational networking components or functions: (1) a source (SF) component 30 operable to receive traffic from a set of servers 12 supported by the access node, (2) a source switching (SX) component 32 operable to switch source traffic to other source switching components of different access nodes 17 (possibly of different access node groups) or to core switches 22, (3) a destination switching (DX) component 34 operable to switch inbound traffic received from other source switching components or from cores switches 22 and (4) a destination (DF) component 36 operable to reorder packet flows and provide the packet flows to destination servers 12.

In some examples, the different operational networking components of access node 17 may perform flow-based switching and ECMP based load balancing for Transmission Control Protocol (TCP) packet flows. Typically, however, ECMP load balances poorly as it randomly hashes the flows to paths such that a few large flows may be assigned to the same path and severely imbalance the fabric. In addition, ECMP relies on local path decisions and does not use any feedback about possible congestion or link failure downstream for any of the chosen paths.

The techniques described in this disclosure introduce a new data transmission protocol referred to as a Fabric Control Protocol (FCP) that may be used by the different operational networking components of access node 17. FCP is an end-to-end admission control protocol in which a sender explicitly requests a receiver with the intention to transfer a certain number of bytes of payload data. In response, the receiver issues a grant based on its buffer resources, QoS, and/or a measure of fabric congestion.

For example, the FCP includes admission control mechanisms through which a source node requests permission before transmitting a packet on the fabric to a destination node. For example, the source node sends a request message to the destination node requesting a certain number of bytes to be transferred, and the destination node sends a grant message to the source node after reserving the egress bandwidth. In addition, instead of the flow-based switching and ECMP forwarding used to send all packets of a TCP flow on the same path to avoid packet reordering, the FCP enables packets of an individual packet flow to be sprayed to all available links between a source node and a destination node. The source node assigns a packet sequence number to each packet of the flow, and the destination node uses the packet sequence numbers to put the incoming packets of the same flow in order.

SF component 30 of access node 17 is considered a source node of the fabric. According to the disclosed techniques, for FCP traffic, SF component 30 is configured to spray its input bandwidth (e.g., 200 Gbps) over links to multiple SX components of access nodes within a logical rack. For example, as described in more detail with respect to FIG. 7B, SF component 30 may spray packets of the same flow across eight links to SX component 32 and seven other SX components of other access nodes within a logical rack. For non-FCP traffic, SF component 30 is configured to select one of the connected SX components to which to send packets of the same flow.

SX component 32 of access node 17 may receive incoming packets from multiple SF components of access nodes within the logical rack, e.g., SF component 30 and seven other SF components of other access nodes within the logical rack. For FCP traffic, SX component 32 is also configured to spray its incoming bandwidth over links to multiple core switches in the fabric. For example, as described in more detail with respect to FIG. 8, SX component 32 may spray its bandwidth across eight links to eight core switches. In some cases, SX component 32 may spray its bandwidth across eight links to four or eight intermediate devices, e.g., TOR Ethernet switches, electrical permutation devices, or optical permutation devices, which in turn forward traffic to the core switches. For non-FCP traffic, SX component 32 is configured to select one of the core switches to which to send packets of the same packet flow. Since the incoming bandwidth to SX component 32 and the outgoing bandwidth from SX component 32 is same (e.g., 200 Gbps), congestion should not occur at the SX stage even for a large number of packet flows.

DX component 34 of access node 17 may receive incoming packets from multiple core switches either directly or via one or more intermediate devices, e.g., TOR Ethernet switches, electrical permutation devices, or optical permutation devices. For example, DX component 34 may receive incoming packets from eight core switches, or four or eight intermediate devices. DX component 34 is configured to select a DF component to which to send the received packets. For example, DX component 34 may be connected to DF component 36 and seven other DF components of other access nodes within the logical rack. In some case, DX component 34 may become a congestion point because DX component 34 may receive a large amount of bandwidth (e.g., 200 Gbps) that is all to be sent to the same DF component. In the case of FCP traffic, DX component 34 may avoid long term congestion using the admission control mechanisms of FCP.

DF component 36 of access node 17 may receive incoming packets from multiple DX components of access nodes within the logical rack, e.g., DX component 34 and seven other DX components of other access nodes within the logical rack. DF component 36 is considered a destination node of the fabric. For FCP traffic, DF component 36 is configured to recorder packets of the same flow prior to transmitting the flow to a destination server 12.

In some examples, SX component 32 and DX component 34 of access node 17 may use the same forwarding table to perform packet switching. In this example, the personality of access node 17 and the nexthop identified by the forwarding table for the same destination IP address may depend on a source port type of the received data packet. For example, if a source packet is received from a SF component, access node 17 operates as SX component 32 and determines a nexthop to forward the source packet over the fabric toward a destination node. If a packet is received from a fabric-facing port, access node 17 operates as DX component 34 and determines a final nexthop to forward the incoming packet directly to a destination node. In some examples, the received packet may include an input tag that specifies its source port type.

Figure 7B:
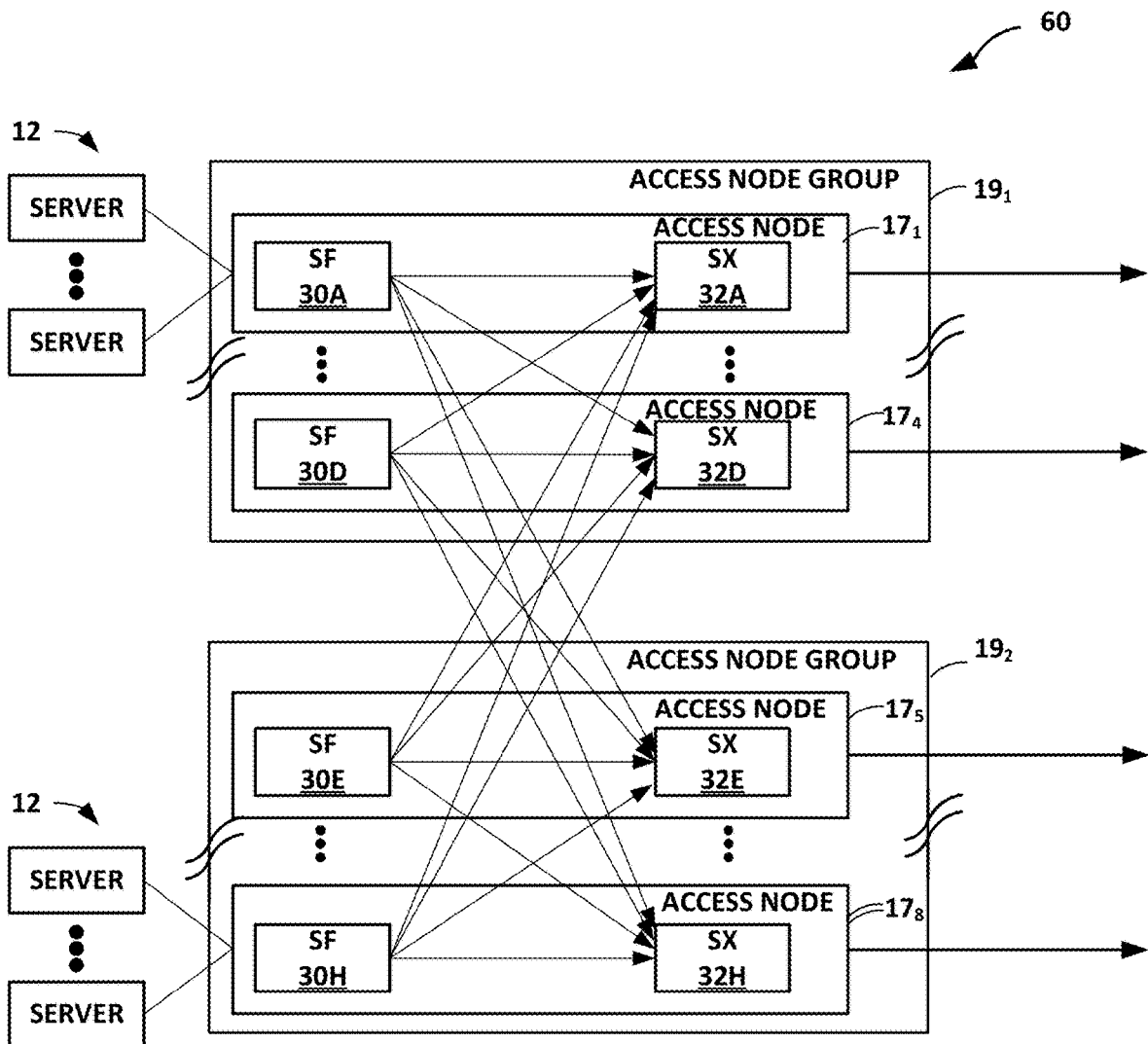
FIG. 7B is a block diagram illustrating an example first-level network fanout achieved between a set of access nodes within a logical rack.

FIG. 7B is a block diagram illustrating an example first-level network fanout achieved between a set of access nodes $17_1$-$17_8$ within a logical rack 60. In the illustrated example of FIG. 7B, logical rack 60 includes two access node groups $19_1$ and $19_2$ containing eight access nodes $17_1$-$17_8$ and server nodes 12 supported by each of the access nodes.

As shown in FIG. 7B, SF components 30A-30H and SX components 32A-32H of access nodes 17 within logical rack 60 have full mesh connectivity in that each SF component 30 is connected to all of the SX components 32 of the eight access nodes 17 within logical rack 60. As described above, the eight access nodes 17 within logical rack 60 may be connected to each other by an 8-way mesh of electrical Ethernet connections. In the case of FCP traffic, SF components 30 of access nodes 17 within logical rack 60 apply spraying algorithms to spray packets for any given packet flow across all available links to SX components 32. In this way, SF components 30 need not necessarily perform a full lookup operation for L2/L3 switching of outbound packets of packet flows originating from servers 12. In other words, packets for a given packet flow may be received by an SF component 30, such as SF component 30A, and sprayed across some or all of the links to SX components 32 for the logical rack 60. In this way, access nodes 17 for a logical rack achieve a first-level fan out of, in this example, 1:8 and may do so, in some examples, without incurring any L2/L3 forwarding lookup relative to keying information in the packet headers. As such, packets for a single packet flow need not follow the same path when sprayed by a given SF component 30.

Thus, according to the disclosed techniques, upon receiving source traffic from one of servers 12, SF component 30A implemented by access node $17_1$, for example, performs an 8-way spray of packets of the same flow across all available links to SX components 32 implemented by access nodes 17 included in logical rack 60. More specifically, SF component 30A sprays across one internal SX component 32A of the same access node $17_1$ and seven external SX components 32B-32H of the other access nodes $17_2$-$17_8$ within logical rack 60. In some implementations, this 8-way spray between SFs 30 and SXs 32 within logical rack 60 may be referred to as a first-stage spray. As described in other portions of this disclosure, a second-stage spray may be performed over a second-level network fanout within the switch fabric between access nodes 17 and core switches 22. For example, the second-stage spray may be performed through an intermediate device, such as a TOR Ethernet switch, an electric permutation device, or an optical permutation device.

In some examples, as described in more detail above, the first four access nodes $17_1$-$17_4$ may be included in a first access node group $19_1$ and the second four access nodes $17_4$-$17_8$ may be included in a second access node group $19_2$. The access nodes 17 within the first and second access node groups 19 may be connected to each other via a full-mesh in order to allow the 8-way spray between SFs 30 and SXs 32 within logical rack 60. In some examples, logical rack 60 including the two access nodes groups together with their supported servers 12 may be referred to as a half-rack or a half physical rack. In other examples, more or fewer access nodes may be connected together using full-mesh connectivity. In one example, sixteen access nodes 17 may be connected together in a full-mesh to enable a first-stage 16-way spray within a full physical rack.

Figure 8:
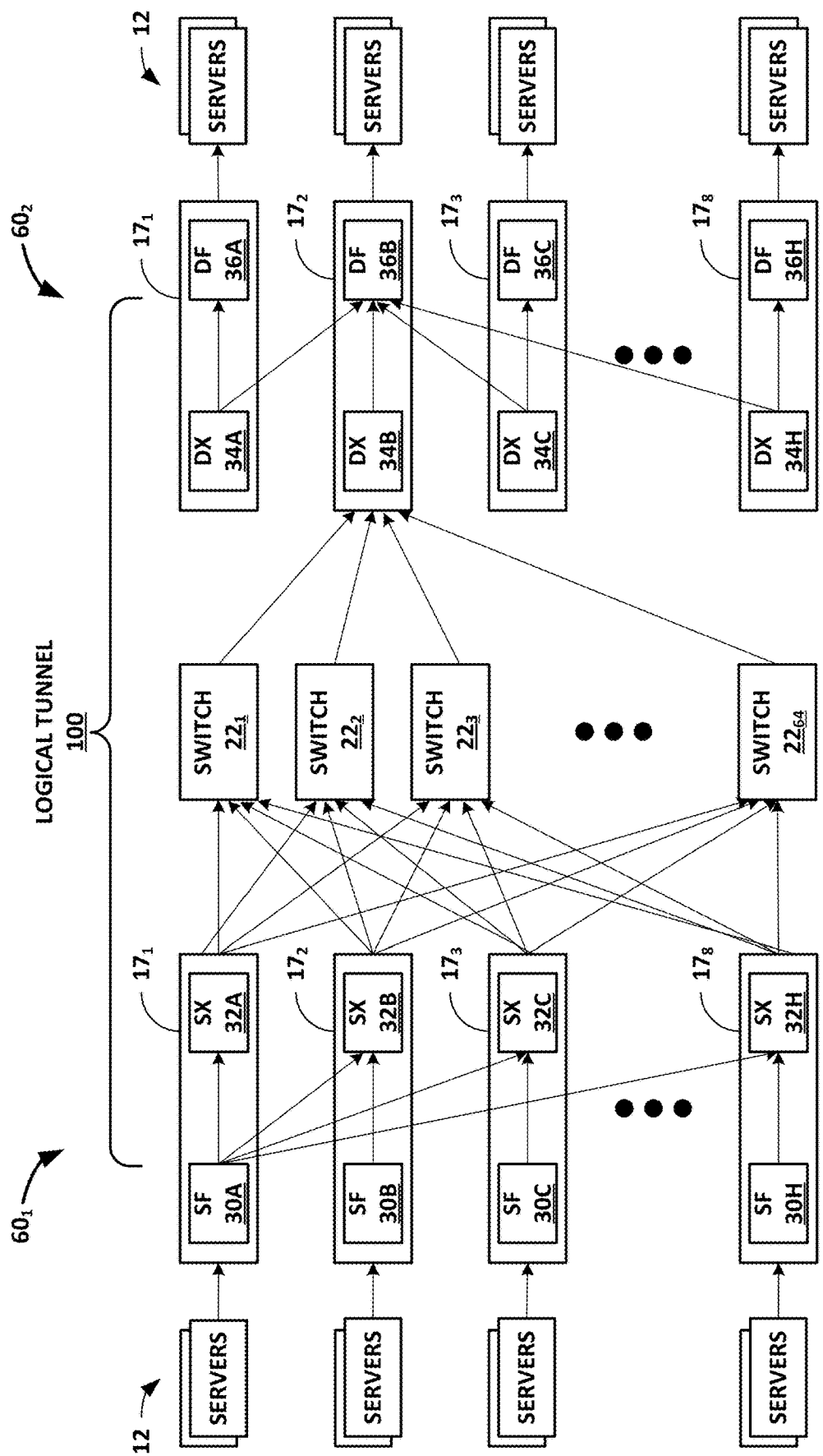
FIG. 8 is a block diagram illustrating an example multi-level network fanout across a data center switch fabric between access nodes.

FIG. 8 is a block diagram illustrating an example multi-level network fanout across a data center switch fabric between access nodes 17. In the illustrated example of FIG. 8, each of the logical racks 60 includes eight access nodes $17_1$-$17_8$ and server nodes 12 supported by each of the access nodes. The first logical rack $60_1$ is connected to the second logical rack $60_2$ through core switches 22 within the switch fabric. In some examples, the first logical rack $60_1$ and the second logical rack $60_2$ may be the same logical rack.

According to the disclosed techniques, the switch fabric comprises a FCP fabric. The FCP fabric may be visualized as including multiple channels, e.g., a request channel, a grant channel, a FCP data channel and a non-FCP data channel. As illustrated in FIG. 8, the FCP data channel carries data packets via a logical tunnel 100 that includes all paths between a source node, e.g., SF component 30A of access node $17_1$, in a first logical rack $60_1$ and a destination node, e.g., DF component 36B of access node $17_2$, in a second logical rack $60_2$. The FCP data channel carries the data packets using the FCP protocol. The FCP packets are sprayed over the fabric from the source node to the destination node through a suitable load balancing scheme. The FCP packets are not expected to be delivered in order, but the destination node is expected to perform packet reordering. For example, packets of a traffic flow received from a source server 12 by SF component 30A of access node $17_1$ may be sprayed over some or all possible links within logical tunnel 100 toward DF component 36B of access node $17_2$. DF component 36B is configured to reorder the received packets to recreate the packet flow prior to transmitting the packet flow to the destination server 12.

The request channel within the FCP fabric may be used to carry FCP request messages from the source node to the destination node. Similar to the FCP data packets, the FCP request messages may be sprayed over all available paths toward the destination node, but the request messages do not need to be reordered. In response, the grant channel within the FCP fabric may be used to carry FCP grant messages from the destination node to source node. The FCP grant messages may also be sprayed over all available paths toward the source node, and the grant messages do not need to be reordered. The non-FCP data channel within the FCP fabric carries data packets that do not use the FCP protocol. The non-FCP data packets may be forwarded or routed using ECMP based load balancing, and, for a given flow identified by a five tuple, the packets are expected to be delivered in order to the destination node.

The example of FIG. 8 illustrates both the first-level network fanout between the access nodes 17 within first logical rack $60_1$, as described above with respect to FIG. 7B, and a second-level network fanout between the access nodes 17 and the core switches 22. As described above with respect to FIGS. 3-4, the eight access nodes 17 within first logical rack $60_1$ are connected to core switches 22 using either electrical or optical Ethernet connections. The eight access nodes 17 within second logical rack $60_2$ are similarly connected to the core switches 22. In some examples, each of access nodes 17 may connect to eight of core switches 22. In the case of FCP traffic, SX components 32 of access nodes 17 within first logical rack $60_1$ apply spraying algorithms to spray packets for any given packet flow across all available paths to the core switches 22. In this way, the SX components 32 may not perform a full lookup operation for L2/L3 switching of received packets.

Upon receiving source FCP traffic from one of the servers 12, an SF component 30A of access node $17_1$ in the first logical rack $60_1$ performs an 8-way spray of packets of the FCP traffic flow across all available paths to SX components 32 implemented by the access nodes 17 in the first logical rack $60_1$. As further illustrated in FIG. 8, each of the SX components 32 then sprays the packets of the FCP traffic flow across all available paths to the core switches 22. In the illustrated example, the multi-level fanout is 8-by-8 and, therefore, supports up to sixty-four core switches $22_1$-$22_{64}$. In other examples, in which the first-level fanout is 1:16 within a full physical rack, the multi-level fanout may be 16-by 16 and support up to 256 core switches.

Although illustrated in FIG. 8 as occurring directly between the access nodes 17 and the core switches 22, the second-level fanout may be performed through one or more TOR devices, such as top of rack Ethernet switches, optical permutation devices, or electrical permutation devices. The multi-level network fanout enables packets of a traffic flow received at any of the access nodes 17 within the first logical rack $60_1$ to reach core switches 22 for further forwarding to any of the access nodes 17 within the second logical rack $60_2$.

According to the disclosed techniques, in one example implementation, each of SF components 30 and SX components 32 uses an FCP spray engine configured to apply a suitable load balancing scheme to spray the packets of a given FCP packet flow across all available links to a destination node. For example, the FCP spray engine may track a number of bytes transmitted on each link in order to select a least loaded link on which to forward a packet. In addition, the FCP spray engine may track link failures downstream to provide flow fairness by spraying packets in proportion to bandwidth weight on each active link. In this way, the spray of packets may not be uniform across the available links toward the destination node, but bandwidth will be balanced across the active links even over relatively short periods.

In this example, the source node, e.g., SF component 30A of access node $17_1$, within first logical rack $60_1$ sends a request message to the destination node, e.g., DF component 36B of access node $17_2$, within second logical rack $60_2$ requesting a certain weight or bandwidth and the destination node sends a grant message to the source node after reserving the egress bandwidth. The source node also determines whether any link failures have occurred between core switches 22 and logical rack $60_2$ that includes the destination node. The source node may then use all active links in proportion to the source and destination bandwidths. As an example, assume there are N links between the source node and the destination node each with source bandwidth $Sb_i$ and destination bandwidth $Db_i$, where i=1 . . . N. The actual bandwidth from the source nodes to the destination node is equal to min(Sb, Db) determined on a link-by-link basis in order to take failures into account. More specifically, the source bandwidth (Sb) is equal to $\Sigma_{i=1}^{N} Sb_i$, and destination bandwidth (Db) is equal to $\Sigma_{i=1}^{N} Db_i$, and the bandwidth ($b_i$) of each link is equal to min($Sb_i$, $Db_i$). The weight of the bandwidth used on each link is equal to $b_i/\Sigma_{i=1}^{N} b_i$.

In the case of FCP traffic, SF components 30 and SX components 32 use the FCP spray engine to distribute packets of the FCP traffic flow based on the load on each link toward the destination node, proportion to its weight. The spray engine maintains credit memory to keep track of credits (i.e., available bandwidth) per nexthop member link, uses packet length included in an FCP header to deduct credits (i.e., reduce available bandwidth), and associates a given packet to the one of the active links having the most credits (i.e., the least loaded link). In this way, for FCP packets, the SF components 30 and SX components 32 spray packets across member links of a nexthop for a destination node in proportion to the member links' bandwidth weights.

Core switches 22 operate as the single hop along logical tunnel 100 between the source node, e.g., SF component 30A of access node $17_1$, in first logical rack $60_1$ and the destination node, e.g., DF component 36B of access node $17_2$, in the second logical rack $60_2$. Core switches 22 perform a full lookup operation for L2/L3 switching of the received packets. In this way, core switches 22 may forward all the packets for the same traffic flow toward the destination node, e.g., DF component 36B of access node $17_2$, in the second logical rack $60_2$ that supports the destination server 12. Although illustrated in FIG. 8 as occurring directly between the core switches 22 and destination access node $17_2$ of second logical rack $60_2$, the core switches 22 may forward all the packets for the same traffic flow to an intermediate TOR device that has connectivity to the destination node. In some examples, the intermediate TOR device may forward all the packet for the traffic flow directly to DX component 34B implemented by access node $17_2$ of second logical rack $60_2$. In other examples, the intermediate TOR device may be an optical or electrical permutation device configured to provide another fanout over which the packets can be sprayed between input and output ports of the permutation device. In this example, all or some portion of the DX components 34 of access nodes 17 of second logical rack $60_2$ may receive sprayed packets of the same traffic flow.

DX components 34 and DF components 36 of access nodes 17 within second logical rack $60_2$ also have full mesh connectivity in that each DX component 34 is connected to all of the DF components 36 within second logical rack $60_2$. When any of DX components 34 receive the packets of the traffic flow from core switches 22, the DX components 34 forward the packets on a direct path to DF component 36B of access node $17_2$. DF component 36B may perform a limited lookup necessary only to select the proper output port for forwarding the packets to the destination server 12. In response to receiving the packets of the traffic flow, DF component 36B of access node $17_2$ within second logical rack $60_2$ reorders the packets of the traffic flow based on sequence numbers of the packets. As such, with respect to full routing tables for the data center, only the core switches 22 may need to perform full lookup operations. Thus, the switch fabric provides a highly-scalable, flat, high-speed interconnect in which servers are effectively one L2/L3 hop from any other server 12 within the data center.

More details on data center network architecture and interconnected access nodes are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

A brief description of FCP and one example of its operation with respect to FIG. 8 is included here. In the example of FIG. 8, access nodes 17 are fabric end points (FEPs) to the FCP fabric, which is made up of switching elements, e.g., core switches 22, arranged in a leaf-spine topology. The FPC fabric allows one access node 17 to communicate with another one through multiple paths. Core switches 22 inside the FCP fabric have shallow packet buffers. The cross-sectional bandwidth of the FCP fabric is equal to or greater than the sum of all end point bandwidths. In this way, if each access node 17 limits the incoming data rate to the FCP fabric, none of the paths inside the FCP fabric should be congested long term with very high probability.

As described above, FCP data packets are sent from a source node, e.g., SF component 30A of access node $17_1$ within first logical rack $60_1$, to a destination node, e.g., DF component 36B of access node $17_2$ within second logical rack $60_2$, via logical tunnel 100. Before any traffic is sent over tunnel 100 using FCP, the connection must be established between the end points. A control plane protocol executed by access nodes 17 may be used to set up a pair of tunnels, one in each direction, between the two FCP end points. The FCP tunnels are optionally secured (e.g., encrypted and authenticated). Tunnel 100 is considered to be unidirectional from the source node to the destination node, and a FCP partner tunnel may be established in the other direction from the destination node to the source node. The control plane protocol negotiates the capabilities (e.g., block size, MTU size, etc.) of both end points, and establishes the FCP connection between the end points by setting up tunnel 100 and its partner tunnel and an initializing queue state context for each tunnel.

Each of the end points is assigned a source tunnel ID and a corresponding destination tunnel ID. At each end point, a queue ID for a given tunnel queue is derived based on the assigned tunnel ID and priority. For example, each FCP end point may allocate a local tunnel handle from a pool of handles and communicate the handle to its FCP connection partner end point. The FCP partner tunnel handle is stored in a lookup table and referenced from the local tunnel handle. For the source end point, e.g., access node $17_1$ within first logical rack $60_1$, a source queue is identified by the local tunnel ID and priority, and a destination tunnel ID is identified from the lookup table based on the local tunnel ID.

Similarly, for the destination end point, e.g., access node $17_2$ within second logical rack $60_2$, a destination queue is identified by the local tunnel ID and priority, and a source tunnel ID is identified from the lookup table based on the local tunnel ID.

FCP tunnel queues are defined as buckets of independent traffic streams that use FCP to transport payload across the FCP fabric. An FCP queue for a given tunnel is identified by the tunnel ID and priority, and the tunnel ID is identified by the source/destination end point pair for the given tunnel. Alternatively, the end points may use a mapping table to derive the tunnel ID and priority based on an internal FCP queue ID for the given tunnel. In some examples, an FCP fabric tunnel, e.g., logical tunnel 100, may support 1, 2, 4, or 8 queues per tunnel. The number of queues per tunnel is a FCP fabric property and may be configured at the time of deployment. All tunnels within the FCP fabric may support the same number of queues per tunnel. Each end point may support a maximum of 16,000 queues.

When the source node is communicating with the destination node, the source node encapsulates the packets using an FCP over UDP encapsulation. The FCP header carries fields identifying tunnel IDs, queue IDs, packet sequence numbers (PSNs) for packets, and request, grant, and data block sequence numbers between the two end points. At the destination node, the incoming tunnel ID is unique for all packets from the specific source node. The tunnel encapsulation carries the packet forwarding as well as the reordering information used by the destination node. A single tunnel carries packets for one or multiple queues between the source and destination nodes. Only the packets within the single tunnel are reordered based on sequence number tags that span across the queues of the same tunnel. The source node tags the packets with tunnel PSNs when they are sent over the tunnel toward the destination node. The destination node reorders the packets based on the tunnel ID and the PSNs. At the end of the reorder, the destination node strips the tunnel encapsulation and forwards the packets to the respective destination queues.

An example of how an IP packet entering FCP tunnel 100 at a source end point is transmitted to a destination end point is described here. A source server 12 having an IP address of A0 sends an IP packet for a destination server 12 having an IP address of B0. The source FCP endpoint, e.g., access node $17_1$ within first logical rack $60_1$, transmits an FCP request packet with source IP address A and destination IP address B. The FCP request packet has an FCP header to carry the Request Block Number (RBN) and other fields. The FCP request packet is transmitted over UDP over IP. The destination FCP end point, e.g., access node $17_2$ within first logical rack $60_2$, sends a FCP grant packet back to the source FCP end point. The FCP grant packet has an FCP header to carry the Grant Block Number (GBN) and other fields. The FCP grant packet is transmitted over UDP over IP. The source end point transmits the FCP data packet after receiving the FCP grant packet. The source end point appends a new (IP+UDP+FCP) data header on the input data packet. The destination end point removes the append (IP+UDP+FCP) data header before delivering the packet to the destination host server.

Figure 9:
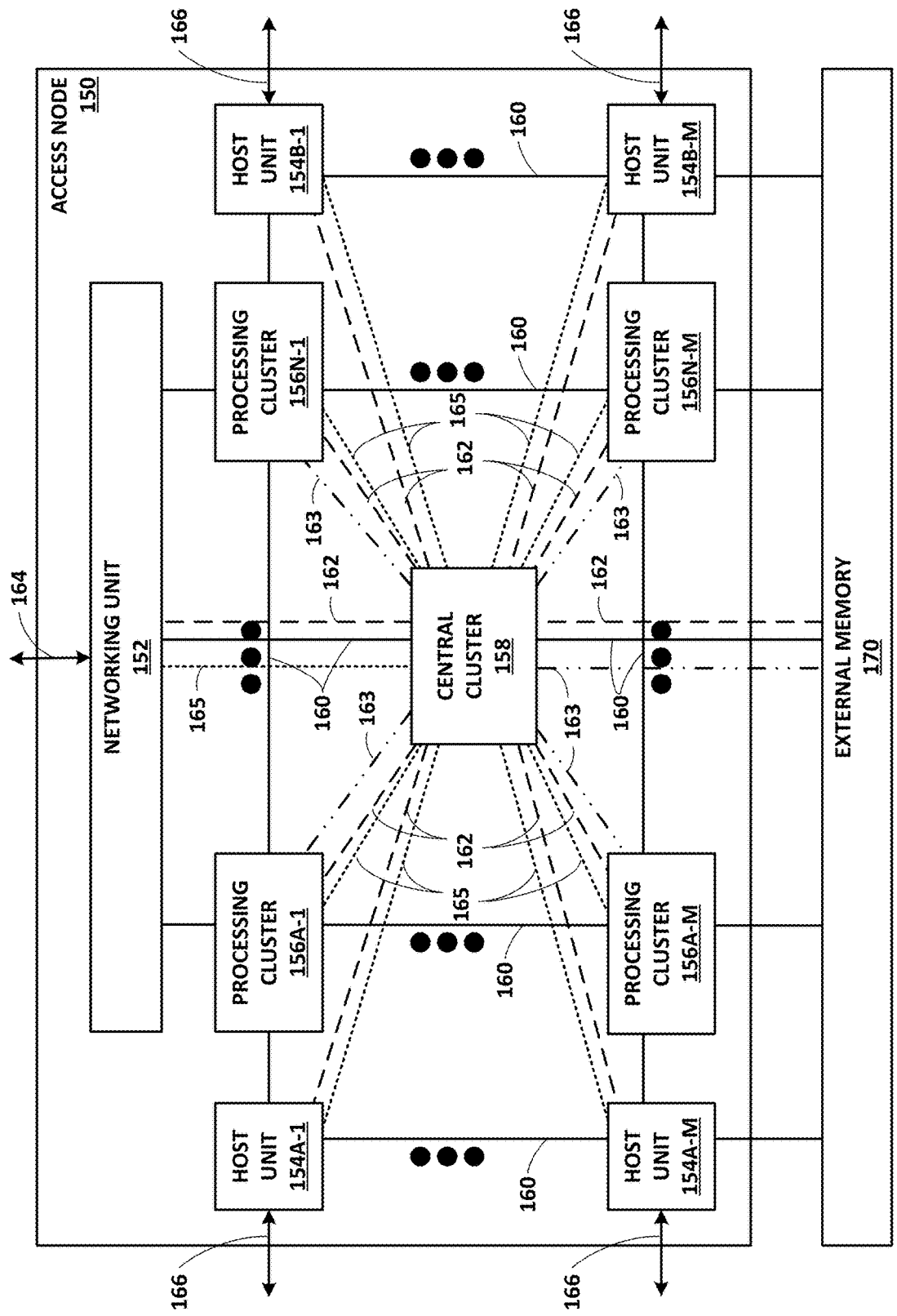
FIG. 9 is a block diagram illustrating an example access node including two or more processing clusters, in accordance with the techniques of this disclosure.

FIG. 9 is a block diagram illustrating an example access node 150 including two or more processing clusters, in accordance with the techniques of this disclosure. Access node 150 generally represents a hardware chip implemented in digital logic circuitry. As various examples, access node 150 may be provided as an integrated circuit mounted on a motherboard of a computing device or installed on a card connected to the motherboard of the computing device via PCI-e, or the like. In some examples, access node 150 may be an integrated circuit within an access node group (e.g., one of access node groups 19) configured as standalone network device for installation within a compute rack, a storage rack, or a converged rack.

Access node 150 may operate substantially similar to any of the access nodes 17 of FIGS. 1-8. Thus, access node 150 may be communicatively coupled to a data center fabric (e.g., switch fabric 14), one or more server devices (e.g., server nodes 12 or servers 52), storage media (e.g., solid state storage 41 of FIG. 3), one or more network devices, random access memory, or the like, e.g., via PCI-e, Ethernet (wired or wireless), or other such communication media in order to interconnect each of these various elements. In this example, access node 150 includes networking unit 152, processing clusters 156A-1-156N-M (processing clusters 156), host units 154A-1-154B-M (host units 154), and central cluster 158, and is coupled to external memory 170.

In general, access node 150 represents a high performance, hyper-converged network, storage, and data processor and input/output hub. As illustrated in FIG. 9, access node 150 includes host units 154 each having PCI-e interfaces 166, networking unit 152 having Ethernet interfaces 164, and processing clusters 156A-M-156N-M and host units 154A-M-154N-M each having interfaces to off-chip external memory 170. Access node 150 may include multiple lanes of PCI-e Generation 3/4 166 that are organized into groups (e.g., ×2, ×4, ×8, or ×16 groups) where each of host units 154 provides one group of PCI-e lanes 166. In addition, access node 150 may include multiple HSS Ethernet lanes 164 that may each be 25G and configurable as 25G, 50G, or 40/100G ports. Access node 150 may also act as a PCI-e endpoint to multiple PCI-e root complexes, e.g., different sockets in multi-socket servers or multi-server enclosures. In such examples, each server may have two x86 processor sockets, each connected to access node 150 using a dedicated PCI-e port.

In this example, access node 150 represents a high performance, programmable multi-processor architecture that may provide solutions to various problems with existing processors (e.g., x86 architecture processors). As shown in FIG. 9, access node 150 includes specialized network-on-chip (NoC) fabrics for inter-processor communication. access node 150 also provides optimizations for stream processing (packet/protocol processing). Work queues are directly attached to cores of access node 150. Access node 150 also provides run-to-completion processing, which may eliminate interrupts, thread scheduling, cache thrashing, and associated costs. Access node 150 operates on "work units" that associate a buffer with an instruction stream to eliminate checking overhead and allow processing by reference to minimize data movement and copy. Access node 150 also operates according to a stream model, which provides streamlined buffer handling with natural synchronization, reduces contention, and eliminates locking. Access node 150 includes non-coherent buffer memory that is separate from coherent cache memory hierarchy and eliminates cache maintenance overhead and penalty, with improved memory access. Access node 150 provides a high performance, low latency messaging infrastructure that may improve inter-process and inter-core communication. Specialized direct memory access (DMA) engines of access node 150 handle bulk data movement and payload manipulation at exit points. Hardware offload modules of access node 150 reduce the work needed per packet, implement ACL, and flow lookup. Hardware allocators of access node 150 may handle memory allocation and freeing.

As described herein, the new processing architecture utilizing an access node may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

As one example, a Work Unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores of a DPU may be configured to execute program instructions using a work unit (WU) stack.

In general, work units are sets of data exchanged between processing clusters 156, networking unit 152, host units 154, central cluster 158, and external memory 170. Each work unit may represent a fixed length (e.g., 32-bytes) data structure including an action value and one or more arguments. In one example, a 32-byte work unit includes four sixty-four (64) bit words, a first word having a value representing the action value and three additional words each representing an argument. The action value may include a work unit handler identifier that acts as an index into a table of work unit functions to dispatch the work unit, a source identifier representing a source virtual processor or other unit (e.g., one of host units 154, networking unit 152, external memory 170, or the like) for the work unit, a destination identifier representing the virtual processor or other unit that is to receive the work unit, an opcode representing fields that are pointers for which data is to be accessed, and signaling network routing information.

The arguments of a work unit may be typed or untyped, and in some examples, one of the typed arguments acts as a pointer used in various work unit handlers. Typed arguments may include, for example, frames (having values acting as pointers to a work unit stack frame), flows (having values acting as pointers to state, which is relevant to the work unit handler function), and packets (having values acting as pointers to packets for packet and/or block processing handlers).

A flow argument may be used as a prefetch location for data specific to a work unit handler. A work unit stack is a data structure to help manage event driven, run-to-completion programming model of an operating system executed by access node 150. An event driven model typically means that state which might otherwise be stored as function local variables must be stored as state outside the programming language stack. Run-to-completion also implies functions may be dissected to insert yield points. The work unit stack may provide the convenience of familiar programming constructs (call/return, call/continue, long-lived stack-based variables) to the execution model of access node 150.

A frame pointer of a work unit may have a value that references a continuation work unit to invoke a subsequent work unit handler. Frame pointers may simplify implementation of higher level semantics, such as pipelining and call/return constructs. More details on work units, work unit stacks, and stream processing by data processing units are available in U.S. Provisional Patent Application No. 62/589,427, filed Nov. 21, 2017, entitled "Work Unit Stack Data Structures in Multiple Core Processor System," and U.S. patent application Ser. No. 15/949,692, entitled "Efficient Work Unit Processing in a Multicore System," filed Apr. 10, 2018, the entire content of each of which is incorporated herein by reference.

Access node 150 may deliver significantly improved efficiency over x86 for targeted use cases, such as storage and networking input/output, security and network function virtualization (NFV), accelerated protocols, and as a software platform for certain applications (e.g., storage, security, and data ingestion). Access node 150 may provide storage aggregation (e.g., providing direct network access to flash memory, such as SSDs) and protocol acceleration. Access node 150 provides a programmable platform for storage virtualization and abstraction. Access node 150 may also perform firewall and address translation (NAT) processing, stateful deep packet inspection, and cryptography. The accelerated protocols may include TCP, UDP, TLS, IPSec (e.g., accelerates AES variants, SHA, and PKC), RDMA, and iSCSI. Access node 150 may also provide quality of service (QoS) and isolation containers for data, and provide LLVM binaries.

Access node 150 may support software including network protocol offload (TCP/IP acceleration, RDMA and RPC); initiator and target side storage (block and file protocols); high level (stream) application APIs (compute, network and storage (regions)); fine grain load balancing, traffic management, and QoS; network virtualization and network function virtualization (NFV); and firewall, security, deep packet inspection (DPI), and encryption (IPsec, SSL/TLS).

In one particular example, access node 150 may expose Ethernet ports of 100 Gbps, of which a subset may be used for local consumption (termination) and the remainder may be switched back to a network fabric via Ethernet interface 164. For each of host units 154, access node 150 may expose a ×16 PCI-e interface 166. Access node 150 may also offer a low network latency to flash memory (e.g., SSDs) that bypasses local host processor and bus.

In the example of FIG. 9, processing clusters 156 and central cluster 158 are arranged in a grid. For example, access node 150 may include "M" rows of "N" processing clusters. In some examples, access node 150 may include 2 rows of 2 processing clusters for a total of 4 processing clusters 156. In other examples, access node 150 may include 3 rows or 3 processing clusters including central cluster 158 for a total of 8 processing clusters 156 arranged with central cluster 158 in a 3×3 grid. In still other examples, access node 150 may include more processing clusters arranged around central cluster 158. Although identified in FIG. 9 as being different than processing clusters 156, it should be understood that central cluster 158 is one of processing clusters 156 and, in some examples, may operate in the same or a similar fashion as any of processing clusters 156.

In some examples, central cluster 158 may include three conceptual processing units (not shown in FIG. 9): a central dispatch unit, a coherence directory unit configured to determine locations of data within coherent memory of access node 150, and a central synchronization unit configured to maintain proper sequencing and ordering of operations within access node 150. Alternatively, in other examples, any of processing clusters 156 may include these conceptual processing units.

Central cluster 158 may also include a plurality of processing cores, e.g., MIPS (microprocessor without interlocked pipeline stages) cores, ARM (advanced RISC (reduced instruction set computing) machine) cores, PowerPC (performance optimization with enhanced RISC—performance computing) cores, RISC-V (RISC five) cores, or CISC (complex instruction set computing or x86) cores. Central cluster 158 may be configured with two or more processing cores that each include at least one virtual processor. In one specific example, central cluster 158 is configured with four processing cores, each including two virtual processors, and executes a control operating system (such as a Linux kernel). The virtual processors are referred to as "virtual processors," in the sense that these processors are independent threads of execution of a single core. However, it should be understood that the virtual processors are implemented in digital logic circuitry, i.e., in requisite hardware processing circuitry.

Access node 150 may be configured according to architectural principles of using a most energy efficient way of transporting data, managing metadata, and performing computations. Access node 150 may act as an input/output (I/O) hub that is optimized for executing short instruction runs (e.g., 100 to 400 instruction runs) or micro-tasks efficiently.

Access node 150 may provide high performance microtask parallelism using the components thereof through work management. For example, access node 150 may couple a low latency dispatch network with a work queue interface at processing clusters 156 to reduce delay from work dispatching to start of execution of the work by processing clusters 156. The components of access node 150 may also operate according to a run-to-completion work flow, which may eliminate software interrupts and context switches. Hardware primitives may further accelerate work unit generation and delivery. Access node 150 may also provide low synchronization, in that the components thereof may operate according to a stream-processing model that encourages flow-through operation with low synchronization and inter-processor communication. The stream-processing model may further structure access by multiple processors (e.g., processors of processing clusters 156) to the same data and resources, avoid simultaneous sharing, and therefore, reduce contention. A processor may relinquish control of data referenced by a work unit as the work unit is passed to the next processor in line. Furthermore, access node 150 may provide a dedicated signaling/dispatch network, as well as a high capacity data network, and implement a compact work unit representation, which may reduce communication cost and overhead.

Access node 150 may also provide memory-related enhancements over conventional architectures. For example, access node 150 may encourage a processing model that minimizes data movement, relying as much as possible on passing work by reference. Access node 150 may also provide hardware primitives for allocating and freeing buffer memory, as well as for virtualizing the memory space, thereby providing hardware-based memory management. By providing a non-coherent memory system for stream data, access node 150 may eliminate detrimental effects of coherency that would otherwise result in surreptitious flushes or invalidates of memory, or artifactual communication and overhead. Access node 150 also provides a high bandwidth data network that allows unfettered access to memory and peripherals such that any stream data update can be done through main memory, and stream cache-to-stream cache transfers are not required. Access node 150 may be connected through a high bandwidth interface to external memory 170.

Access node 150 may also provide features that reduce processing inefficiencies and cost. For example, access node 150 may provide a stream processing library (i.e., a library of functions available to programmers for interfacing with access node 150) to be used when implementing software to be executed by access node 150. That is, the stream processing library may provide one or more application programming interfaces (APIs) for directing processing tasks to access node 150. In this manner, the programmer can write software that accesses hardware-based processing units of access node 150, such that a CPU can offload certain processing tasks to hardware-based processing units of access node 150. The stream processing library may handle message passing on behalf of programs, such that meta-data and state are pushed to the cache and stream memory associated with the core where processing occurs. In this manner, access node 150 may reduce cache misses, that is, stalls due to memory accesses. Access node 150 may also provide lock-free operation. That is, access node 150 may be implemented according to a message-passing model that enables state updates to occur without the need for locks, or for maintaining the stream cache through coherency mechanisms. Access node 150 may also be implemented according to a stream operating model, which encourages data unit driven work partitioning and provides an intuitive framework for determining and exploiting parallelism. Access node 150 also includes well-defined hardware models that process intensive operations such as cyclical redundancy checks (CRC), cryptography, compression, and the like.

In general, access node 150 may satisfy a goal of minimizing data copy and data movement within the chip, with most of the work done by reference (i.e., passing pointers to the data between processors, e.g., processors within or between processing clusters 156). Access node 150 may support two distinct memory systems: a traditional, coherent memory system with a two-level cache hierarchy, and a non-coherent buffer memory system optimized for stream processing. The buffer memory may be shared and cached at the L1 level, but coherency is not maintained by hardware of access node 150. Instead, coherency may be achieved through machinery associated with the stream processing model, in particular, synchronization of memory updates vs. memory ownership transfer. Access node 150 uses the non-coherent memory for storing packets and other data that would not cache well within the coherent memory system. More details on the bifurcated memory system included in the access node are available in U.S. patent application Ser. No. 15/949,892, filed Apr. 10, 2018, and titled "Relay Consistent Memory Management in a Multiple Processor System," the entire content of which is incorporated herein by reference.

In the example of FIG. 9, access node 150 includes at least four processing clusters 156, although other numbers of processing clusters 156 may be used in other examples. Each of processing clusters 156 may include two or more general purpose processing cores (e.g., MIPS cores, ARM cores, PowerPC cores, RISC-V cores, or CISC or x86 cores) and one or more accelerators. In one particular example, access node 150 includes four processing clusters 156, each including two processing cores, for a total of eight cores, and one accelerator per processing cluster. In another example, access node 150 includes eight processing clusters 156, each including six processing cores, for a total of forty-eight cores, and two accelerators per processing cluster. In a further example, access node 150 includes fifteen processing clusters 156, each including four processing cores, for a total of sixty cores, and two accelerators per processing cluster.

A general-purpose operating system, such as Linux or Unix, can run on one or more of processing clusters 156. Central cluster 158 may be configured differently from processing clusters 156 (which may be referred to as stream processing clusters). For example, central cluster 158 executes the operating system kernel (e.g., Linux kernel) as a control plane. Processing clusters 156 may function in run-to-completion thread mode. That is, processing clusters 156 may operate in a tight loop fed by work queues associated with each virtual processor in a cooperative multi-tasking fashion. Processing cluster 156 may further include one or more hardware accelerator units to accelerate networking, matrix multiplication, cryptography, compression, timer management, direct memory access (DMA), and copy, among other tasks.

Networking unit 152 includes a forwarding pipeline implemented using flexible engines (e.g., a parser engine, a look-up engine, and a rewrite engine) and supports features of IP transit switching. Networking unit 152 may also use processing cores (e.g., MIPS cores, ARM cores, PowerPC cores, RISC-V cores, or CISC or x86 cores) to support control packets and low-bandwidth features, such as packet-multicast (e.g., for OSI Layers 2 and 3). Access node 150 may act as a combination of a switch/router and a number of network interface cards. The processing cores of networking unit 152 (and/or of processing clusters 156) may perform network interface card functionality, packet switching, and the like, and may use large forwarding tables and offer programmability.

Host units 154, processing clusters 156, central cluster 158, networking unit 152, and external memory 170 are communicatively interconnected via four types of links. A first set of direct links 162 (represented as dashed lines in FIG. 9) directly connect central cluster 158 to each of the other components of access node 150, that is, host units 154, processing clusters 156, networking unit 152, and external memory 170, to form a signaling network associated with the non-coherent memory system. A second set of direct links 163 (represented as dot-dot-dashed lines in FIG. 9) directly connect central cluster 158 to each of processing clusters 156 and external memory 170 to form a coherency network associated with the coherent memory system. A third set of direct links 165 (represented as dotted lines in FIG. 9) directly connect central cluster 158 to each of host units 154, processing clusters 156, and networking unit 152 to form a broadcast network associated with a resource management system of access node 150. Additionally, grid links 160 (represented as solid lines in FIG. 9) connect neighboring components (including host units 154, processing clusters 156, networking unit 152, and external memory 170) to each other in a two-dimensional grid to form a data network. For example, host unit 154A-1 is directly coupled via grid links 160 to processing cluster 156A-1 and host unit 154A-M.

In this manner, processing clusters 156, host units 154, central cluster 158, networking unit 152, and external memory 170 are interconnected using two or three main network-on-chip (NoC) fabrics. These internal fabrics may include a data network fabric formed by grid links 160, and one or more control network fabrics including one or more of a signaling network formed by hub-and-spoke links 162, a coherency network formed by hub-and-spoke links 163, and a broadcast network formed by hub-and-spoke links 165. The signaling network, coherency network, and broadcast network are formed by direct links similarly arranged in a star-shaped network topology. Alternatively, in other examples, only the data network and one of the signaling network or the coherency network may be included. The data network is a two-dimensional mesh topology that carries data for both coherent memory and buffer memory systems. In one example, each grid link 160 provides a 512b wide data path in each direction. In one example, each direct link 162 and each direct link 163 provides a 128b wide bidirectional data path. The coherency network is a logical hub and spoke structure that carries cache coherency transactions (not including data). The signaling network is a logical hub and spoke structure that carries buffer memory requests and replies (not including data), synchronization and other commands, and work units and notifications.

Access node 150 includes various resources, i.e., elements in limited quantities that are consumed during performance of various functions. Example resources include work unit queue sizes, virtual processor cycles, accelerator cycles, bandwidth of external interfaces (e.g., host units 154 and networking unit 152), memory (including buffer memory, cache memory, and external memory), transient buffers, and time. In general, each resource can be translated to either time or space (e.g., memory). Furthermore, although certain resources can be reclaimed (such as memory), other resources (such as processing cycles and bandwidth) cannot be reclaimed.

Access node 150 (and more particularly, networking unit 152, host units 154, and processing clusters 156, and central clusters 158) may use the broadcast network formed by direct links 165 to broadcast a utilization status of their corresponding resources to central cluster 158. Central cluster 158 may include an event queue manager (EQM) unit that stores copies of these utilization statuses for use when assigning various work units to these elements. Alternatively, in other examples, any of processing clusters 156 may include the EQM unit.

The utilization statuses may be represented as normalized color values (NCVs). Virtual processors may check the NCV of a desired resource to determine if the virtual processors can accept a work unit. If the NCV is above an allowable threshold for an initial work unit, each of the virtual processors places a corresponding flow in a pending state and sends an enqueue (NQ) event to the EQM. A flow is a sequence of computations that belong to a single ordering class. Each flow may be associated with a unique flow identifier (ID) that can be used to look up an entry for the flow in a global flow table (GFT). The flow entry may be linked to all reusable resources consumed by the flow so that these resources can be found and recovered when needed.

In response, the EQM enqueues the event into the specified event queue and monitors the NCV of the corresponding resource. If the NCV is below a desired dequeue (DQ) threshold, the EQM dequeues a calculated number of events from the head of the event queue. The EQM then translates these dequeued events into high-priority work unit messages and sends these work unit messages to their specified virtual processor destinations. The virtual processors use these dequeued events to determine if a flow can be transitioned from the pending state to an active state. For activated flows (i.e., those placed in the active state), the virtual processors may send a work unit to the desired resource. Work units that result from a reactivation are permitted to transmit if the NCV is below a threshold that is higher than the original threshold used to make the Event NQ decision as discussed above.

Access node 150 (and more particularly, networking unit 152, host units 154, processing clusters 156, and central clusters 158) uses the signaling network formed by direct links 162 to transport non-coherent buffer memory requests and replies, and work requests and notifications for inter-processor and interface unit communication (e.g., communication between processors of processing clusters 156 or processors of networking unit 152 and central cluster 158). The signaling network formed by direct links 162 is a non-blocking, switched, low latency fabric that allows access node 150 to reduce delay between event arrival (e.g., arrival of a packet on a network interface of networking unit 152 coupled to Ethernet lanes 164, arrival of a work request on one of PCI-e lanes 166 at one of host units 154, or arrival of remote procedure calls (RPCs) between processing cores of processing clusters 156 and/or central cluster 158) and start of execution by one of the cores. "Synchronization" refers to the proper sequencing and correct ordering of operations within access node 150.

Access node 150 (and more particularly, processing clusters 156 and central clusters 158) also uses the coherency network formed by direct links 163 to transport cache coherence requests and responses. Cores of processing clusters 156 and central cluster 158 may operate on a number of work queues in a prioritized matter. For example, each core may include one or more virtual processors, e.g., one to four virtual processors, and each virtual processor may operate on one to four work queues. The coherency network formed by direct links 162 provide services including inter-cluster cache coherence (e.g., for request and/or reply traffic for write updates, read miss, and flush operations).

Central cluster 158 is a logical central reflection point on both the signaling network formed by direct links 162 and the coherency network formed by direct links 163 that provides ordering for data sent within the signaling network and the coherency network, respectively. Central cluster 158 generally performs tasks such as handling a global cache directory and processing synchronization and coherence transactions, ensuring atomicity of synchronized operations, and maintaining a wall-clock time (WCT) that is synchronized with outside sources (e.g., using precision time protocol (PTP), IEEE 1588). Central cluster 158 is configured to address several billion synchronization/coherence messages per second. Central cluster 158 may be subdivided into sub-units where necessary for capacity to handle aggregated traffic. Alternatively, in other examples, any of processing cluster 156 may perform the tasks described herein as being performed by central cluster 158.

As shown in FIG. 9, the data network is formed by grid links 160 and connects processing clusters 156, host units 154, central cluster 158, networking unit 152, and external memory 170. In particular, each of host unit 154A-M, processing cluster 156A-M, processing cluster 156N-M, and host unit 154B-M is connected to external memory 170 via a respective grid link 160. Although not shown in FIG. 9, data network routers are provided at intersections of columns and rows of the data network fabric (e.g., within or coupled to host units 154, processing clusters 156, and central cluster 158). These routers may be coupled to respective host units 154, processing clusters 156, and central cluster 158 via a 512b bidirectional data network links. In the example of FIG. 9, processing clusters 156A-1 and 156N-1 are shown as communicatively coupled to networking unit 152, although it should be understood that the routers for processing clusters 156A-1 and 156N-1 may in fact be communicatively coupled to networking unit 152 via grid links 160.

Access node 150 (and more particularly, networking unit 152, host units 154, processing clusters 156, and central clusters 158) use the data network formed by grid links 160 to transport buffer memory blocks to/from L1 buffer caches of cores within processing clusters 156 and central cluster 158. Access node 150 also uses the data network to transport cluster level buffer memory data, off-chip DRAM memory data, and data for external interfaces (e.g., interfaces provided by host units 154 and networking unit 152). Access node 150 also uses the data network to transport coherent memory lines to and from L2 caches of processing clusters 156, interface DMA engines, and off-chip DRAM memory.

"Messaging" may refer to work units and notifications for inter-processor and interface unit communication (e.g., between processing cores and/or processors of processing clusters 156, central cluster 158, host units 154, and networking unit 152). Central cluster 158 may include a central dispatch unit (CDU) (not shown) that is responsible for work unit (WU) queuing and flow control, work unit and completion notification dispatch, and load balancing and processor selection (e.g., selection of processors for performing work units among processing cores of processing clusters 156 and/or central cluster 158). The CDU may allow ordering of work units with respect to other messages of central cluster 158.

The CDU of central cluster 158 may also perform credit-based flow control, to manage the delivery of work units. The CDU may maintain a per-virtual-processor output queue plus per-peripheral unit queue of work units that are scheduled by the CDU, as the destination virtual processors allow, as a flow control scheme and to provide deadlock avoidance. The CDU may allocate each virtual processor of cores of processing clusters 156 a fixed amount of storage credits, which are returned when space is made available. The work queues may be relatively shallow. The CDU may include a work scheduling system that manages work production to match the consumption rate (this does not apply to networking unit 152, and may be performed via scheduling requests for storage). Processing clusters 156 switch work units destined for virtual processors within a common one of processing clusters 156 locally within the processing cluster's work unit queue system.

In general, central cluster 158 ensures that the ordering of messages of the same type (e.g., coherence, synchronization, or work units) seen on an output towards a cluster or peripheral is the same as the order in which the messages were seen at each input to central cluster 158. Ordering is not specified between multiple messages received from different inputs by central cluster 158. Alternatively, in other examples, any of processing cluster 156 may include the CDU and perform the tasks described herein as being performed by central cluster 158.

Networking unit 152 may expose Ethernet lanes 164 for connectivity to a network, such as switch fabric 14 of FIG. 1. In one particular example, networking unit 152 may expose twenty-four high speed symmetrical (HSS) Ethernet lanes (e.g., for 25 Gbps). Each of host units 154 may expose PCI-e lanes 166 for connectivity to host devices (e.g., servers) and data storage devices, e.g., solid state drives (SSDs). In one particular example, each of host units 152 may expose a number of PCI-e lanes 166, which may be bifurcatable into multiple independent ports. In this example, access node 150 may be connected to four servers via two processor sockets per server using at least one PCI-e lane to each socket, and to eight SSDs using at least one PCI-e lane to each SSD.

Networking unit 152 connects to an Ethernet network via Ethernet lanes 164 and interfaces to the data network formed by grid links 160 and the signaling network formed by direct links 162, i.e., the data and signaling internal fabrics. Networking unit 152 provides a Layer 3 (i.e., OSI networking model Layer 3) switch forwarding path, as well as network interface card (NIC) assistance.

As NIC assistance, networking unit 152 may perform various stateless assistance processes, such as checksum offload for Internet protocol (IP), e.g., IPv4 or IPv6, transmission control protocol (TCP), and/or uniform datagram protocol (UDP). Networking unit 152 may also perform assistance processes for receive side-scaling (RSS), large send offload (LSO), large receive offload (LRO), virtual local area network (VLAN) manipulation, and the like. On the Ethernet media access control (MAC) side, in one example, networking unit 152 may use multiple combination units, each with four 25 Gb HSS lanes that can be configured as 1×40/100G, 2×50G, or 4×25/10/1G. Networking unit 152 may also support Internet protocol security (IPsec), with a number of security associations (SAs). Networking unit 152 may include cryptographic units for encrypting and decrypting packets as necessary, to enable processing of the IPsec payload.

Networking unit 152 may also include a flexible network packet parsing unit. The packet parsing unit may be configured according to a specialized, high-performance implementation for common formats, including network tunnels (e.g., virtual extensible local area network (VXLAN), network virtualization using generic routing encapsulation (NVGRE), generic network virtualization encapsulation (GENEVE), multiprotocol label switching (MPLS), or the like). Networking unit 152 may also include an OSI Layer 3 (L3) switch that allows cut-through Ethernet to Ethernet switching, using a local memory (not shown) of networking unit 152, as well as host-to-host switching.

One or more hardware direct memory access (DMA) engine instances (not shown) may be attached to three data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 provide interfaces to respective PCI-e bus lanes 166. This allows access node 150 to operate as an endpoint or as a root (in dual mode). For example, access node 150 may connect to a host system (e.g., an x86 server) as an endpoint device, and access node 150 may connect as a root to endpoint devices, such as SSD devices.

In the example of FIG. 9, access node 150 includes 2 columns of "M" host units 154. In some examples, access node 150 may include 2 columns of 2 for a total of four host units 154. In other examples, access node 150 may include 2 columns of 3 for a total of six host units. In still other examples, access node 150 may only include one host unit. Although illustrated in a grid pattern with processing clusters 156 in FIG. 9, in other examples access node 150 may include any number of host units not necessarily tied to rows of processing clusters. In one particular example, each of host units 154 exposes 16 PCI-e lanes 166, divisible into granularity of ×4 units (e.g., for SSD) or ×8 units for system connectivity. Host units 154 may include respective bifurcated controllers (not shown) that are separate entities. Each of host units 154 may include one or more controllers, e.g., one controller per set of ×4 PCI-e lanes. In general, each of host units 154 includes respective virtualization resources that are not shared among other host units 154.

Each of host units 154 may also include a respective hardware DMA engine (not shown). Each DMA engine is configured to fetch data and buffer descriptors from host memory, and to deliver data and completions to host memory. Each DMA engine also sends messages to the PCI controller to trigger interrupt generation. Additional functionality may be provided by core processing units of host units 154 that execute software, which consume streams of buffer descriptors, such as generating DMA addresses for payload placement and/or generating completion addresses.

Processing clusters 156 and central cluster 158 may perform data protection mechanisms to protect data stored in on- or off-chip memory, such as in buffers or in external memory 170. Such data protection mechanisms may reduce or eliminate silent data corruption (SDC) probability with single bit soft errors (such errors may occur due to radiation, cosmic rays, internally generated alpha particles, noise, etc. . . . ) and escaped multi-bit errors.

Access node 150 may execute various types of applications. Examples of such applications are classified below according to three axes: layering, consumption model, and stream multiplexing. Three example layers of software/applications within the context of access node 150 include access software, internal software, and applications. Access software represents system software, such as drivers and protocol stacks. Such access software is typically part of the kernel and runs in root/privileged mode, although in some cases, protocol stacks may be executed in user space. Internal software includes further system software and libraries, such as storage initiator/target software that execute on top of the access software. Traditionally, internal software is executed in kernel space. Applications represents user applications that execute in user space. Consumption models can be broadly classified on a spectrum with a protocol processing model (header consumption) at one end and byte processing model (data consumption) at the other end. Typically, system software is near the protocol processing model end, and user applications tend to form the majority of applications at the byte processing model end.

Table 1 below categorizes example software/applications according to the various layers and consumption models discussed above:

TABLE 1

| Application Classification | | | |
|---|---|---|---|
| | Layering | | |
| Streams | Access | Internal | Applications |
| Consumption Header Payload | Drivers — | Storage Compression Encryption | Firewall Deep packet inspection |

In this manner, access node 150 may offer improvements over conventional processing systems with respect to work management, memory management, and/or processor execution.

Figure 10A:
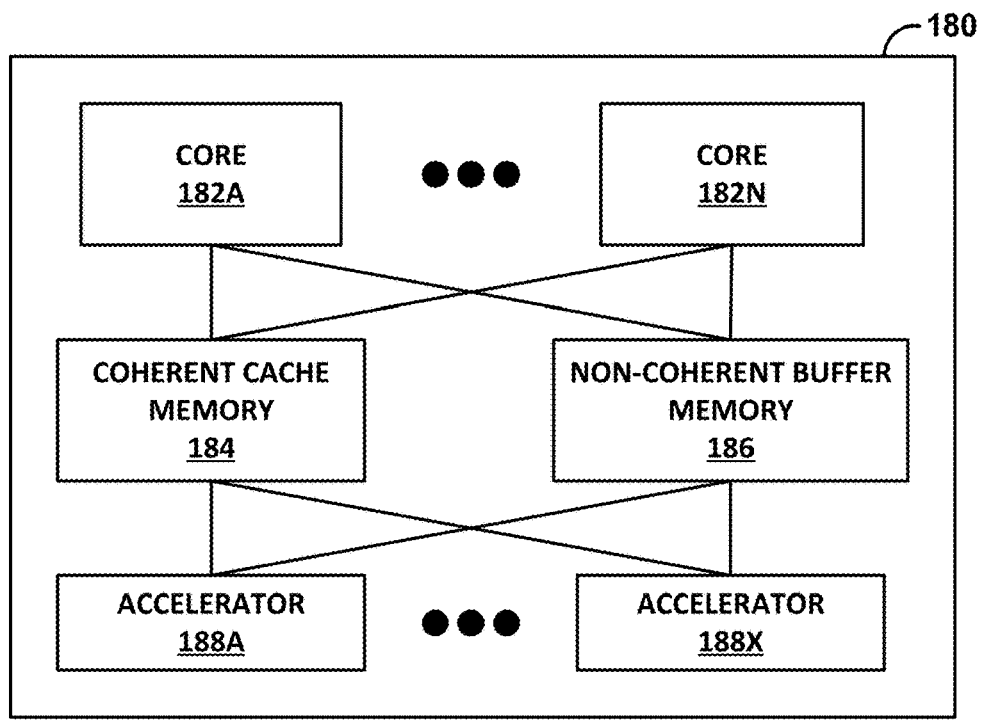
FIG. 10A is a block diagram illustrating an example processing cluster including a plurality of programmable processing cores.

FIG. 10A is a block diagram illustrating an example processing cluster 180 including a plurality of programmable processing cores 182A-182N. Each of processing clusters 156 of access node 150 of FIG. 9 may be configured in a manner substantially similar to that shown in FIG. 10A. In this example, processing cluster 180 includes cores 182A-182N ("cores 182"), coherent cache memory 184, non-coherent buffer memory 186, and accelerators 188A-188X ("accelerators 188"). In one example, processing cluster 180 may include two processing cores 182 and at least one accelerator 188. In another example, processing cluster 180 may include six processing cores 182 and two accelerators 188. As noted above, an access node (such as access node 150 of FIG. 9) may support two distinct memory systems: a coherent memory system and a non-coherent buffer memory system. In the example of FIG. 10A, coherent cache memory 184 represents part of the coherent memory system (e.g., coherent cache memory 184 may comprise a level two (L2) coherent cache memory where cores 182 may also include one or more level one (L1) data caches, e.g., as discussed with respect to FIG. 10B below), while non-coherent buffer memory 186 represents part of the non-coherent buffer memory system. Cores 182 may represent the processing cores discussed with respect to access node 150 of FIG. 9. Cores 182 may share non-coherent buffer memory 186, which in one example may be a 2 MB buffer memory. As one example, cores 182 may use non-coherent buffer memory 186 for sharing streaming data, such as network packets.

In general, accelerators 188 perform acceleration for various data-processing functions, such as look-ups, matrix multiplication, cryptography, compression, regular expressions, or the like. That is, accelerators 188 may comprise hardware implementations of look-up engines, matrix multipliers, cryptographic engines, compression engines, regular expression interpreters, or the like. For example, accelerators 188 may include a lookup engine that performs hash table lookups in hardware to provide a high lookup rate. The lookup engine may be invoked through work units from external interfaces and virtual processors of cores 182, and generates lookup notifications through work units. Accelerators 188 may also include one or more cryptographic units to support various cryptographic processes, such as any or all of Advanced Encryption Standard (AES), Galois/Counter Mode (GCM), block cipher mode (BCM), Secure Hash Algorithm (SHA), public key cryptography, elliptic curve cryptography, RSA, any of their variants, or the like. One or more of such cryptographic units may be integrated with networking unit 152 (FIG. 9), in some examples, to perform Internet protocol security (IPsec) cryptography and/or secure sockets layer (SSL) cryptography. Accelerators 188 may also include one or more compression units to perform compression and/or decompression, e.g., according to ZIP, PKZIP, GZIP, Lempel-Ziv, public format compression such as Snappy, or the like. The compression units may be configured to perform gather-list-based data consumption and/or scatter-list-based data delivery. The compression units may receive work requests and provide work notifications. The compression units may have access to hardware allocators of access node 150 that handle memory allocation and freeing, e.g., within external memory 170 (FIG. 9), since the size of the output buffer for decompression may not be known a-priori.

Figure 10B:
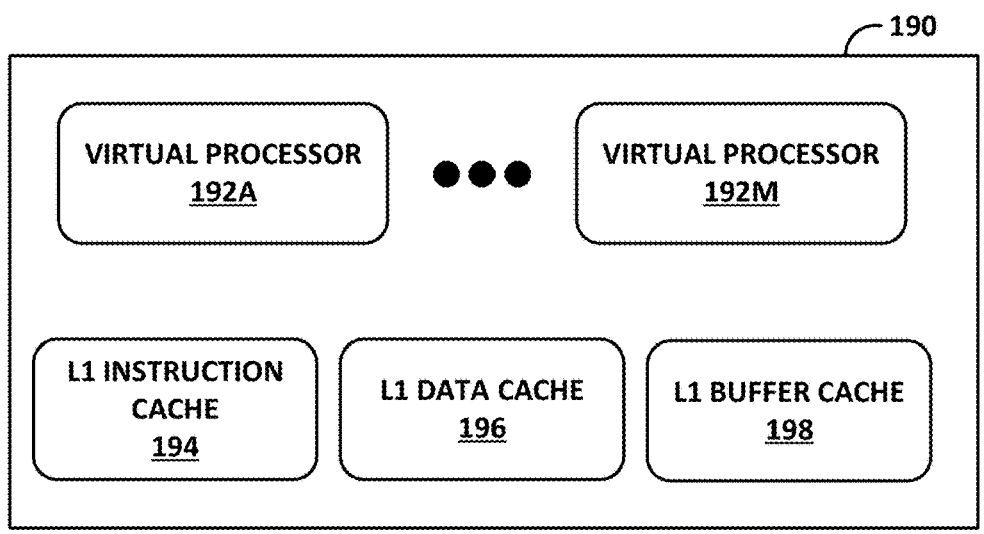
FIG. 10B is a block diagram illustrating an example programmable processing core of a processing cluster.

FIG. 10B is a block diagram illustrating components of an example programmable processing core 190 of a processing cluster. Each of cores 182 of FIG. 10A may include components substantially similar to those of core 190 of FIG. 10B. In this example, cores 190 may be a dual-issue with dual integer unit, and is configured with one or more hardware threads referred to as Virtual Processors (VPs) 192A-192M ("VPs $19_2$"). Core 190 also includes a level 1 (L1) instruction cache $19_4$ and a L1 data cache 196. When each of cores 182 of FIG. 10A includes an L1 data cache similar to L1 data cache 196, the L1 data caches of cores 182 may share L2 coherent cache memory 184 of FIG. 10A. In some example, the cache size for processing cluster 180 (FIG. 10A) may be 1 MB or larger.

Core 190 also includes a L1 buffer cache 198, which may be smaller than L1 data cache 196. Core 190 may use L1 buffer cache 198 for non-coherent data, such as packets or other data for software managed through stream processing mode. L1 buffer cache 198 may store data for short-term caching, such that the data is available for fast access.

When one of virtual processors 192, such as virtual processor 192A, accesses memory, virtual processor 192A uses L1 data cache 196 or L1 buffer cache 198, based on the physical memory address issued by a memory management unit (not shown). Access node 150 (FIG. 9) and components thereof, such as processing clusters 156 and cores thereof (such as cores 182 of FIG. 10A), may be configured to split memory space into separate ranges for buffer memory and coherent memory, e.g., by using high order address bits, which allows the ranges to be mapped to either buffer memory or coherent memory.

Figure 11:
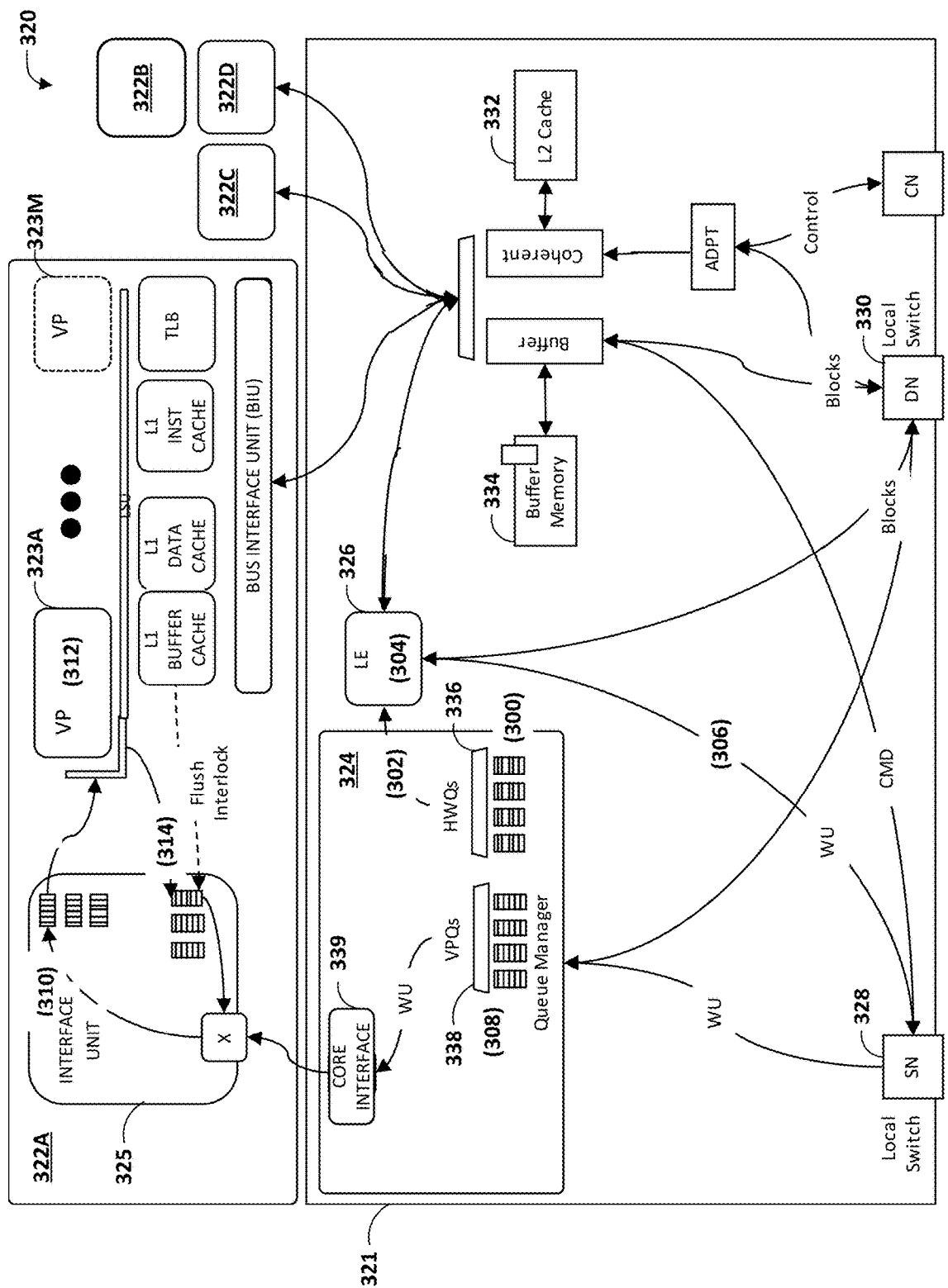
FIG. 11 is a flow diagram illustrating an example process by which a processing cluster processes a work unit.

FIG. 11 is a flow diagram illustrating an example process by which a processing cluster 320 processes a work unit. In this example, processing cluster 320 includes cores 322A-322D (cores 322), which may include components similar to core 190 of FIG. 10B. Processing cluster 320 also includes a cluster manager (CM) 321 with work unit queue manager (WQM) 324, look-up engine (LE) 326, local switch 328 that participates in the signaling network (SN), and local switch 330 that participates in the data network (DN). Queue manager 324 manages hardware queues (HWQs) 336 and virtual processor queues (VPQs) 338. Cores 322 include respective virtual processors and Level 1 (L1) caches, e.g., as discussed above with respect to FIG. 10B. Processing cluster 320 further includes L2 cache 332 and buffer memory 334, which may correspond respectively to L2 coherent cache memory 184 and non-coherent buffer memory 186 of FIG. 10A.

Initially, queue manager 324 of processing cluster 320 queues a work unit (WU) in a one of hardware queues (HWQs) 336 (300). When queue manager 324 "pops" the work unit from the one of hardware queues 336, queue manager 324 delivers the work unit to LE 326 (302). LE 326 processes the work unit (304) and determines that the work unit is to be delivered to one of cores 322 (in particular, core 322A, in this example) of processing cluster 320. Thus, LE 326 forwards the work unit to local switch 328 of the signaling network (SN) (306), which forwards the work unit to be queued in one of virtual processor queues (VPQs) 338.

After queue manager 324 pops the work unit from the one of virtual processor queues 338 (308), queue manager 324 delivers the work unit via core interface 339 to core 322A (310), in this example. Interface unit 325 of core 322A then delivers the work unit to one of the virtual processors (VPs) 323A-323M (VP 323A, in this example), which processes the work unit (312), i.e., performs the work associated with the work unit. For example, initially, VP 323A receives the work unit and issues a prefetch request specifying relevant addresses of cached data. VP 323A retrieves the data from either the L1 data cache or the L1 buffer cache, depending on the addresses from the prefetch request and a cache coherency attribute. The prefetched data may be delivered to accelerators associated with core 322A to perform accelerator processing. VP 323A then outputs corresponding results (possibly including one or more work unit messages) from execution of the work unit back through interface unit 325 of core 322A (314). For example, VP 323A may generate the one or more new work unit messages, and may utilize interlocking of work unit transmission with the execution of a cache flushing finite state machine (FSM) of core 322A.

Figure 12:
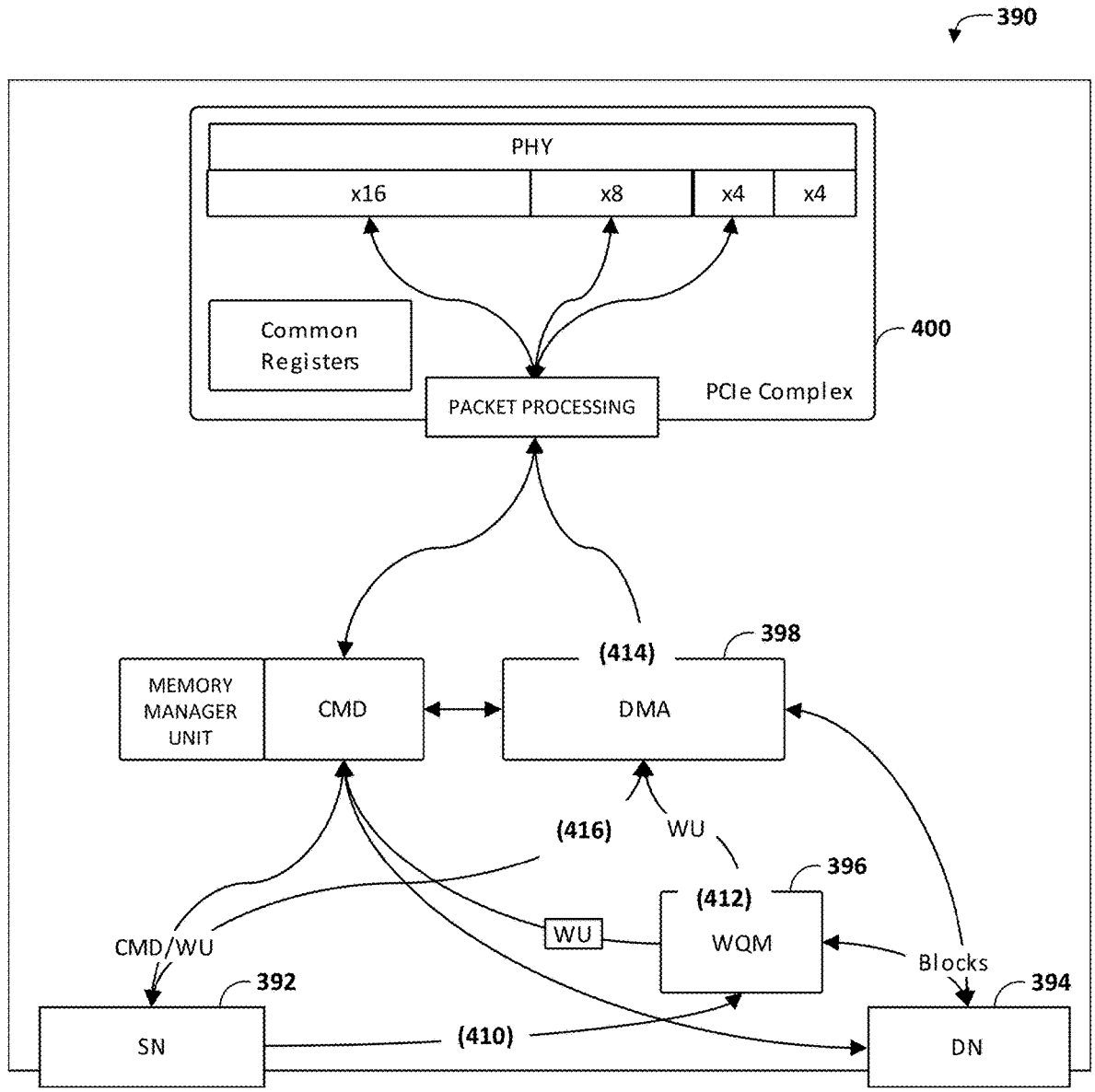
FIG. 12 is a flow diagram illustrating an example process by which a host unit processes a data request.

FIG. 12 is a flow diagram illustrating an example process by which a host unit 390 processes a data request (e.g., a request for data from a connected server device, storage device such as an SSD, or the like). Host unit 390 may be similar to any of host units 154 of FIG. 9. In this example, host unit 390 includes a local switch 392 for communicating via the signaling network (SN), local switch 394 for communicating via the data network (DN), work unit queue manager (WQM) 396 for queueing and managing work units, direct memory access (DMA) unit 398, and PCI-e complex 400, which may be configured to provide a single ×16 PCI-e port, two ×8 PCI-e ports, or four ×4 PCI-e ports, in this example.

Initially, host unit 390 receives a request for data via local switch 392 of the signaling network, which forwards the request to WQM 396 (410), which queues the request in the form of a work unit. After WQM 396 pops the work unit from the corresponding queue, WQM 396 delivers the work unit to DMA engine 398 (412). DMA engine 398 processes the work unit to retrieve the requested data via PCI-e complex 400 (414). DMA engine 398 then delivers the requested data via local switch 394 of the data network, and completes other processes such as signaling completion and freeing buffer memory space via local switch 392 of the signaling network (416).

Figure 13:
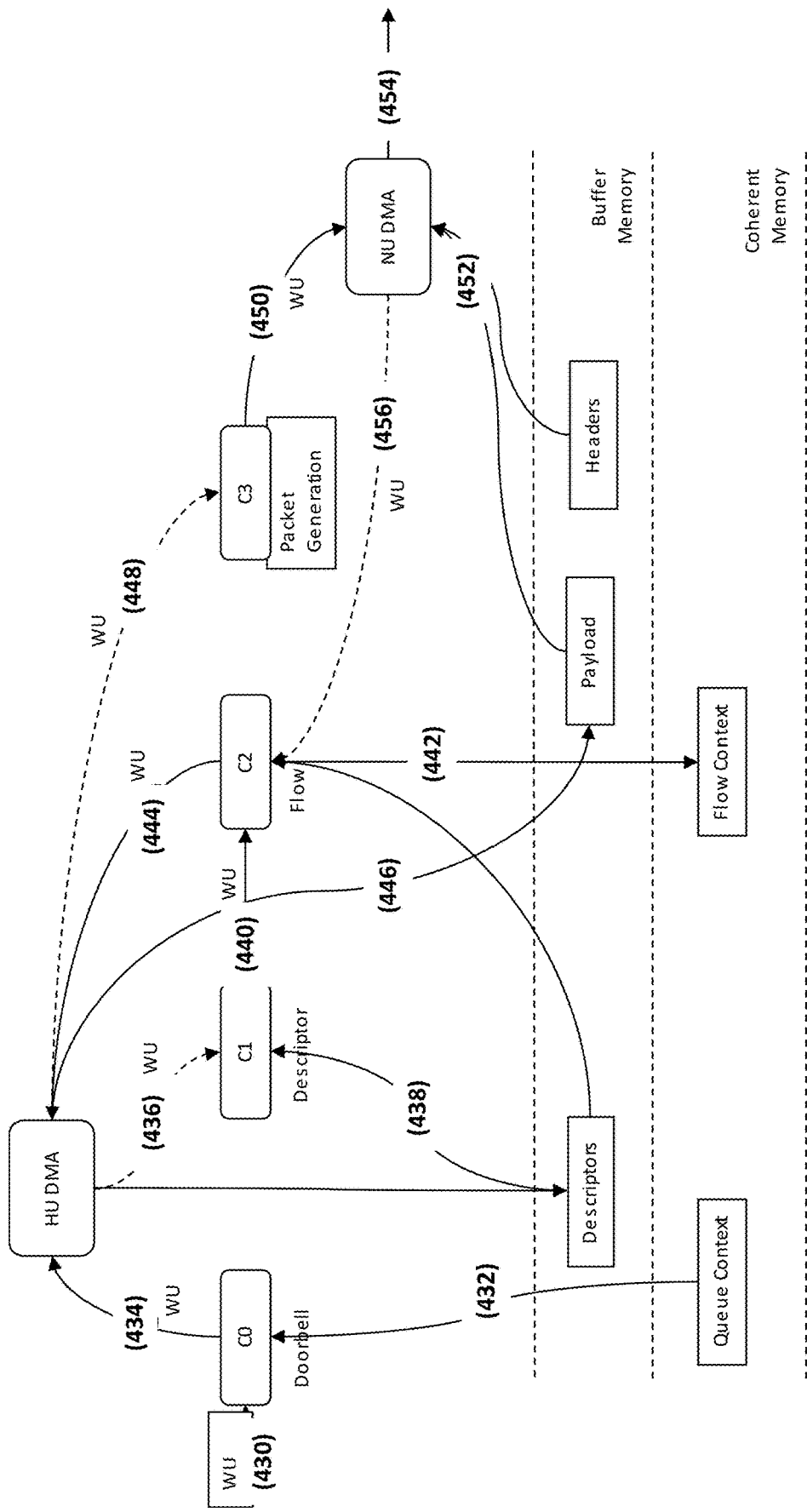
FIG. 13 is a flow diagram illustrating an example transmission pipeline processing flow for processing stream data, such as packets.

FIG. 13 is a flow diagram illustrating an example transmission pipeline processing flow for processing stream data, such as packets. FIG. 13 illustrates examples of processing cores (which may correspond to cores 182 of FIG. 10A and include components similar to core 190 of FIG. 10B), a host unit (HU) DMA (which may correspond to a DMA engine of one of host units 154 of FIG. 9), non-coherent buffer memory (which may correspond to non-coherent buffer memory 186 of FIG. 10A and/or data stored off-chip, e.g., in external memory 170 of FIG. 9), coherent memory (which may correspond to L2 coherent cache memory 184 of FIG. 10A and/or data stored off-chip, e.g., in external memory 170 of FIG. 9), and a networking unit (NU) DMA, which may correspond to a DMA of networking unit 152 (FIG. 9).

Initially, processing core 0 (C0) of a processing cluster receives a work unit indicating that a packet (or other streaming unit of data) is to be constructed and transmitted from data received via a host unit (e.g., from a server device, storage device, or other device connected to an access node via the host unit) (430). Processing core 0 also receives a doorbell from a queue context (432), to cause processing core 0 to send a work unit to the host unit DMA (HU DMA) to retrieve the descriptors of the data to be transmitted (434).

The host unit DMA retrieves the data and sends a work unit including descriptor data to core 1 (C1) (436), in this example. Core 1 then accesses the descriptor data from the buffer memory (438) and determines the flow context associated with the descriptor data, and a core tasked with processing the data (e.g., core 2). Core 1 sends a work unit to core 2 (C2) (440), which prompts core 2 to retrieve the descriptors from the buffer memory, and also retrieve a flow context for the corresponding packet flow from coherent memory (442). Core 2 then sends a work unit to the host unit DMA to retrieve data for the packet to be constructed (444). The host unit DMA stores the data for the packet to be constructed, including a payload and any header information, in the buffer memory (446), and sends a work unit to core 3 (C3) (448) indicating that the data is available. Core 3 then generates data for constructing the packet, and sends this data in the form of a work unit to the networking unit DMA (NU DMA) (450).

The networking unit DMA then retrieves the header and payload data (452) from the buffer memory, fully assembles the packet, and forwards the packet, e.g., via Ethernet lanes (454). The networking unit DMA then provides a work unit back to core 2 (456), which may, for example, include data in response to the packet sent via the Ethernet lanes.

Figure 14:
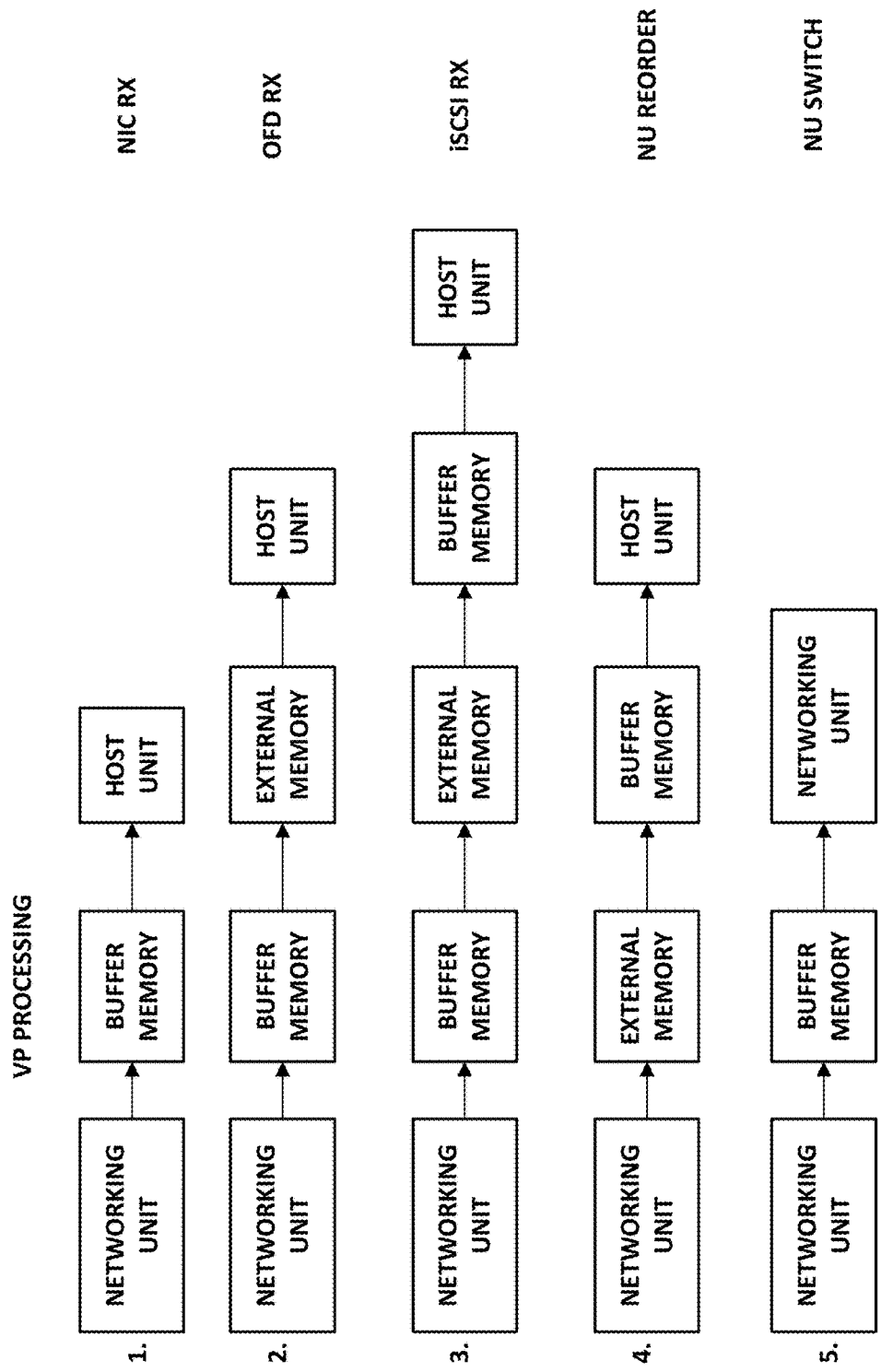
FIG. 14 is a series of flow diagrams illustrating various example processing flows from a networking unit to a host unit or back to the networking unit.

FIG. 14 is a series of flow diagrams illustrating various example processing flows from a networking unit (NU) to a host unit (HU) or back to the networking unit, such as networking unit 152 to one of host units 154 of FIG. 9. FIG. 14 illustrates that such flows may include passage through various components of an access node, such as a buffer memory and/or an external memory. An access node in accordance with the techniques of this disclosure is generally an I/O hub, and therefore, primary flows start at an interface and end at another interface, which may be one of the host units and/or the networking unit.

In this example, buffer memory may correspond to on-chip memory, such as non-coherent buffer memory 186 of FIG. 10A. External memory corresponds to off-chip memory, such as external memory 170 of FIG. 9. In particular, in these examples, external memory may particularly refer to an address range allocated to buffer memory (i.e., non-coherent memory) of off-chip high bandwidth memory.

The first example flow corresponds to a simple transit case, such as network interface card (NIC) processing. In this case, the networking unit receives a packet from the network, selects a cluster buffer memory to store the packet, and when the packet is delivered, generates a work unit (WU) to a virtual processor of a core (typically within the same cluster) that is responsible for processing the packet. The virtual processor performs processing (in the NIC case, looking up the queue where the packet is to be delivered, and determining the host buffer in which to place the packet) and generates a work unit to the appropriate host unit scatter-gather DMA engine. The latter reads (gathers) the packet contents and delivers (scatters) the packet contents as instructed in the work unit.

The second example flow corresponds to the case where the virtual processor does not have a host buffer available for delivering the packet, or is required to gather more payload before delivery (e.g., for a framed protocol over TCP, such as HTTP). In this case, the payload is moved to external memory until delivery is possible. At that time, the same process is followed as above with respect to the first example flow, to move the packet to the host. That is, the virtual processor performs processing (in the NIC case, looking up the queue where the packet is to be delivered, and determining the host buffer in which to place the packet) and generates a work unit to the appropriate host unit scatter-gather DMA engine. The latter reads (gathers) the packet contents and delivers (scatters) the packet contents as instructed in the work unit.

The third example flow corresponds to cases that require an additional processing step following storage in external memory, such as protocols that require session level processing, e.g., SSL where the payload of an assembled record is to be decrypted. In this case, the payload is moved to a cluster buffer memory where an accelerator (e.g., a cryptography unit) engine performs the work needed, before the host unit DMA engine is instructed to deliver the result to host memory.

The fourth example flow shows a fabric use case where packets have been reordered in the network, and the networking unit reorders the packets after the networking unit receives the packets and determines that the packets are out of order. In this case, received packets are stored in buffer memory or external memory until they can be passed to the virtual processors in the correct order. FIG. 14 shows the external memory being used by the networking unit as a reorder buffer, and packets moved to buffer memory for processing.

The fifth example flow depicts an access node being used to switch traffic between networking unit ports, using buffer memory as a buffer. This path is not expected in normal operation (because the networking unit is expected to switch internally), but this case may be useful in some situations to provide additional buffering.

Figure 15:
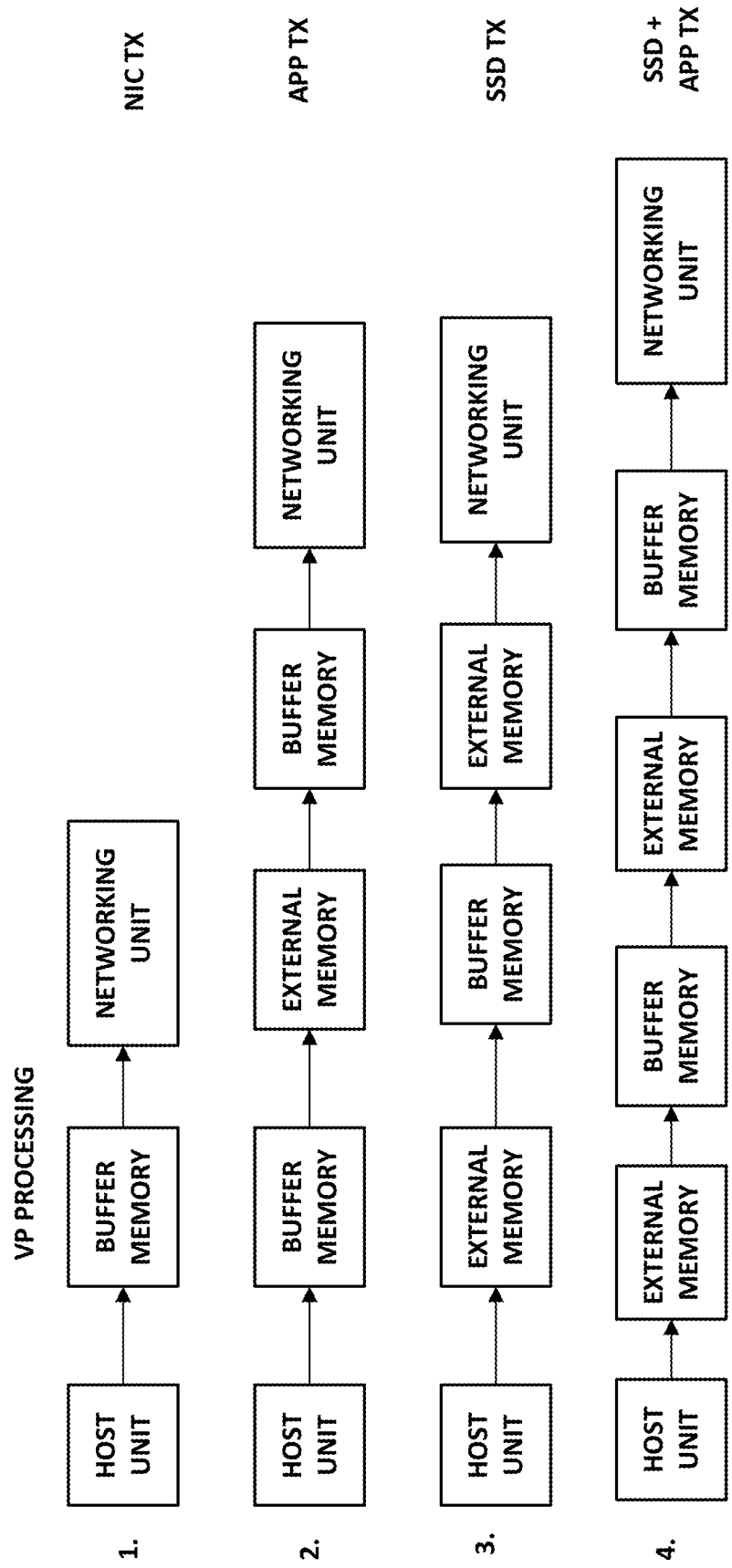
FIG. 15 is a series of flow diagrams illustrating various example processing flows from a host unit to a networking unit.

FIG. 15 is a series of flow diagrams illustrating various example processing flows from a host unit to a networking unit, such as one of host units 154 to networking unit 152 of FIG. 9. FIG. 15 illustrates that such flows may include passage through various components of an access node, such as a buffer memory and/or an external memory.

The first example scenario of FIG. 15 illustrates the converse of a simple NU to HU transit scenario (e.g., the first example flow, NIC transmit case, of FIG. 14). In this scenario, a packet is stored by the host unit within a cluster buffer memory, before processing and transmission on an NU interface. Like the host unit, the networking unit features a DMA engine that can gather data from the various access node memory locations. However, unlike the networking unit, which receives packets from the network unprompted, the host unit injects packets into the access node as a result of a request (pull) work unit from a virtual processor.

The second example scenario is likewise the opposite of the second example flow of FIG. 14. The second example scenario of FIG. 15 corresponds to a flow where additional processing is needed before transmission. One example would be using external memory as an SSD cache, where data is compressed and stored in external memory and, thus, requires decompression by the cluster level accelerator before transmission. Another example would be an application where data is processed in buffer memory first with results stored in external memory. Then a final processing step collates results into a buffer memory for transmission.

The third example scenario of FIG. 15 is more common and corresponds to reading data off of storage devices, such as SSD devices. In this case, the host unit first delivers the data to external memory, and a virtual processor is notified of the transfer completion. The virtual processor then moves the data into buffer memory for processing by a transport virtual processor (e.g., SSL encryption), followed by transmit TCP processing, which stores a copy of the data in external memory, in case retransmission is later needed.

The fourth example scenario of FIG. 15 extends the third example scenario with a second pass through on-chip buffer memory before transmission. A possible use case leading to this flow would be an application that reads data from a storage device into external memory, moves the data to buffer memory for processing, and stores the results into external memory. Finally, the results from multiple processors are collated into buffer memory and transmitted. If transmission uses TCP, then a copy of the transmitted data would be stored in external memory as in the third example scenario of FIG. 15.

Figure 16:
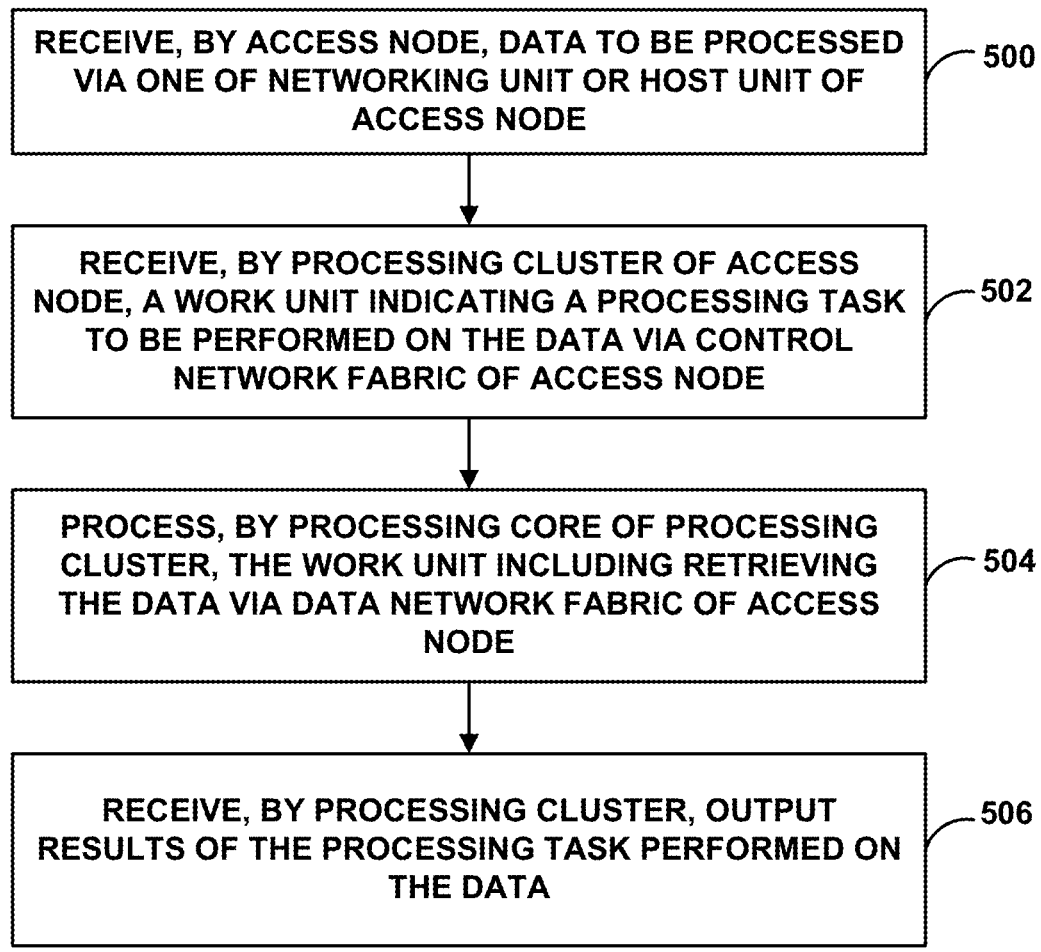
FIG. 16 is a flowchart illustrating an example operation of an access node performing data processing, in accordance with the techniques described herein.

FIG. 16 is a flowchart illustrating an example operation of an access node performing data processing, in accordance with the techniques described herein. The example operation of FIG. 16 is described herein with respect to access node 150 of FIG. 9, processing cluster 180 of FIG. 10A, and programmable processing core 190 of FIG. 10B.

In the example of FIG. 16, access node 150 receives data to be processed via one of networking unit 152 or one of host units 154 of access node 150 (500). Networking unit 152 is configured to control input and output of the data between a network and access node 150. Each of host unit 154 is configured to control input and output of the data between one or more application processors (e.g., local processors of a computing device that includes access node 150 or processors of server devices), and control storage of the data with storage devices.

A processing cluster 180 of a plurality of processing clusters 156 included in access node 150 then receives a work unit indicating a processing task to be performed on the data from one of networking unit 152, host units 154, or another one of the processing clusters 156 via a control network fabric (e.g., the signaling network formed by direct links 162) of access node 150 (502). Upon receiving the work unit, processing cluster 180 determines the programmable processing core 190 to perform the processing task, and sends the work unit to a queue associated with a virtual processor (e.g., virtual processor 192A) of the plurality of virtual processors 192 included in programmable processing core 190.

A programmable processing core 190 of two or more programmable processing cores 182 included in processing cluster 180 processes the work unit, including retrieving the data on which the processing task is to be performed from one of networking unit 152, host units 154, or one of processing clusters 156 via a data network fabric (e.g., the data network formed by grid links 160) of access node 150 (504). Processing cluster 180 includes coherent cache memory 184 and non-coherent buffer memory 186, and, as part of retrieving the data on which the processing task is to be performed, stores stream data in non-coherent buffer memory 186 and stores other data in the coherent cache memory 184. In addition, programmable processing core 190 includes L1 data cache 196 for caching coherent data and L1 buffer cache 198 for caching non-coherent data, and, as part of retrieving the data on which the processing task is to be performed, caches the stream data in L1 buffer cache 198 and caches the other data in L1 data cache 196.

To process the work unit, virtual processor 192A receives the work unit from the associated queue indicating the processing task to be performed on the data, and fetches the data from one of L1 data cache 196 or L1 buffer cache 198 of programmable processing core 190. Virtual processor 192A then performs the indicated processing task on the data, and outputs the results of the processing task including one or more work unit messages back to programmable processing core 190. The processing cluster 180 then receives the output results of the processing task performed on the data from programmable processing core 190 (506).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
receiving, by an access node coupled to both a network and a plurality of network devices, data to be processed, wherein the access node includes a plurality of processing cores, a data network fabric, and a control network fabric,
wherein the data network fabric is configured to communicate data between the plurality of processing cores, the network, and the plurality of network devices, and
wherein the control network fabric is configured to communicate control messages between the plurality of processing cores, the network, and the plurality of network devices;
receiving, by the access node and over the control network fabric, a work unit message indicating a processing task to be performed by a processing core; and
processing, by the access node, the work unit message by:
retrieving data associated with the work unit message over the data network fabric,
storing, in non-coherent buffer memory, the data,
caching the data in a cache,
modifying the data in the cache,
writing the data in the cache to the non-coherent buffer memory, and relinquishing control of the data in the non-coherent buffer memory by passing a work unit message to another processor.

2. The method of claim 1, wherein the data is stream data comprising packets of network data.

3. The method of claim 2, wherein caching the data includes:
caching, in a level one data cache, the stream data.

4. The method of claim 3, wherein processing the work unit message includes:
identifying a work unit processor for processing the work unit message, wherein the work unit processor is one of the plurality of processing cores; and
sending the work unit message to a queue associated with the work unit processor.

5. The method of claim 4, wherein processing the work unit message includes:
receiving, by the work unit processor, the work unit message from the queue;
fetching, by the work unit processor, the stream data from the level one data cache; and
outputting, by the work unit processor, the results of the processing the work unit message.

6. The method of claim 4, wherein processing the work unit message includes:
receiving, by the work unit processor, the work unit message from the queue;
fetching, by the work unit processor, the stream data from the non-coherent buffer memory; and
outputting, by the work unit processor, the results of the processing the work unit message.

7. The method of claim 4, wherein processing the work unit message includes outputting a new work unit message.

8. The method of claim 1, wherein processing the work unit message includes:
performing, by an accelerator unit included within the access node, an accelerator operation.

9. The method of claim 8, wherein the accelerator operation includes at least one of:
performing a lookup, performing a matrix multiplication, performing cryptographic operations, performing data compression operations, or performing regular expression operations.

10. An access node comprising:
a network unit coupling the access node to a network;
a host unit coupling the access node to host devices;
processing circuitry for processing data;
non-coherent buffer memory;
a data network fabric configured to communicate data between the processing circuitry, the network, and the plurality of host devices; and
a control network fabric configured to communicate control messages between the processing circuitry, the network, and the plurality of host devices;
wherein the processing circuitry is configured to receive, over the control network fabric, a work unit message identifying a processing task to be performed and process the work unit message by:
retrieving data associated with the work unit message over the data network fabric,
storing, in the non-coherent buffer memory, the data,
caching the data in a cache,
modifying the data in the cache,
writing the data in the cache to the non-coherent buffer memory, and
relinquishing control of the data in the non-coherent buffer memory by passing a work unit message to another processor.

11. The access node of claim 10, wherein to store the data, the processing circuitry is further configured to:
store, in the non-coherent buffer memory, stream data comprising packets of network data.

12. The access node of claim 11, wherein the processing circuitry includes a plurality of processing cores, and wherein to process the work unit message, the process circuitry is further configured to:
identify a work unit processor for processing the work unit message, wherein the work unit processor is one of the plurality of processing cores; and
send the work unit message to a queue associated with the work unit processor.

13. The access node of claim 12, wherein to process the work unit message, the processing circuitry is further configured to:
receive, by the work unit processor, the work unit message from the queue;
fetch, by the work unit processor, the stream data from the level one data cache; and
outputting, by the work unit processor, the results of the processing the work unit message.

14. The access node of claim 12, wherein to process the work unit message, the processing circuitry is further configured to:
receive, by the work unit processor, the work unit message from the queue;
fetch, by the work unit processor, the stream data from the non-coherent buffer memory; and
outputting, by the work unit processor, the results of the processing the work unit message.

15. The access node of claim 12, wherein to process the work unit message, the processing circuitry is further configured to:
output a new work unit message.

16. The access node of claim 10, wherein the processing circuitry further includes an accelerator unit, and wherein to process the work unit message, the processing circuitry is further configured to:
perform, by the accelerator unit, an accelerator operation.

17. The access node of claim 16, wherein to perform the accelerator operation, the accelerator unit is configured to perform an operation including at least one of:
a lookup, a matrix multiplication, a cryptographic operation, a data compression operation, or a regular expression operation.

18. A system comprising:
a plurality of host devices, including at least one server device and at least one storage device;
a network; and
an access node comprising:
a network unit coupling the access node to the network,
a host unit coupling the access node to the plurality of host devices,
processing circuitry for processing data,
non-coherent buffer memory,
a data network fabric configured to communicate data between the processing circuitry, the network, and the plurality of host devices, and
a control network fabric configured to communicate control messages between the processing circuitry, the network, and the plurality of host devices, wherein the access node is configured to receive, over the control network fabric, a work unit message identifying a processing task to be performed and process the work unit message by:

retrieving data associated with the work unit message over the data network fabric, storing, in the non-coherent buffer memory, the data, caching the data in a cache, modifying the data in the cache, writing the data in the cache to the non-coherent buffer memory, and relinquishing control of the data in the non-coherent buffer memory by passing a work unit message to another processor.

\* \* \* \* \*